(12) United States Patent
Kobayashi et al.

(10) Patent No.: US 8,152,676 B2
(45) Date of Patent: Apr. 10, 2012

(54) SPEED CHANGE GEAR

(75) Inventors: Tsune Kobayashi, Okazaki (JP); Hideki Shibata, Kariya (JP)

(73) Assignee: Jtekt Corporation, Osaka-shi (JP)

( * ) Notice: Subject to any disclaimer, the term of this patent is extended or adjusted under 35 U.S.C. 154(b) by 0 days.

(21) Appl. No.: 13/088,864

(22) Filed: Apr. 18, 2011

(65) Prior Publication Data

US 2011/0259133 A1 Oct. 27, 2011

(30) Foreign Application Priority Data

Apr. 23, 2010 (JP) ................. 2010-100175

(51) Int. Cl.
*F16H 1/32* (2006.01)
(52) U.S. Cl. ...................... 475/162; 475/330
(58) Field of Classification Search .......... 475/162, 475/178, 179, 180, 330
See application file for complete search history.

(56) References Cited

U.S. PATENT DOCUMENTS

| | | | | |
|---|---|---|---|---|
| 2,520,282 | A * | 8/1950 | Erwin | 475/174 |
| 4,050,331 | A * | 9/1977 | Braren | 475/168 |
| 7,351,177 | B2 * | 4/2008 | Christ | 475/168 |
| 2005/0016321 | A1 | 1/2005 | Watanabe | |

FOREIGN PATENT DOCUMENTS

| | | |
|---|---|---|
| EP | 0 300 108 A2 | 1/1989 |
| EP | 0 305 535 A1 | 3/1989 |
| EP | 1 036 954 A2 | 9/2000 |
| JP | 60-127150 U | 8/1985 |
| JP | 2002-266955 | 9/2002 |
| JP | 2009-171786 | 7/2009 |
| JP | 2010-19286 | 1/2010 |
| WO | WO 03/006845 A1 | 1/2003 |

OTHER PUBLICATIONS

European Search Report issued Dec. 23, 2011 in European Patent Application No. 11162587.

* cited by examiner

*Primary Examiner* — Justin Holmes
(74) *Attorney, Agent, or Firm* — Oblon, Spivak, McClelland, Maier & Neustadt, L.L.P.

(57) ABSTRACT

A speed change gear includes: a housing that has internal gears having different inside diameters; and a plurality of change gear units that are respectively in mesh with the plurality of internal gears and that change the speed of rotation from an input shaft to an output shaft. Each of the change gear units includes a rotating member that has one of a pin protruding in a direction along an input/output axis and an insertion hole; an eccentric member that centers on an eccentric axis that is eccentric with respect to the input/output axis; and an oscillating member that oscillatingly rotates as the eccentric member rotates about the input/output axis.

3 Claims, 12 Drawing Sheets

| n | TRANSMISSION RATIO | SPEED REDUCING EFFICIENCY | SPEED INCREASING EFFICIENCY |
|---|---|---|---|
| 1 | 13 | 0.922 | 0.916 |
| 2 | 169 | 0.850 | 0.839 |
| 3 | 2197 | 0.784 | 0.769 |
| 4 | 28561 | 0.723 | 0.704 |

Fig. 5

SPEED CHANGE GEAR

INCORPORATION BY REFERENCE/RELATED APPLICATION

This application claims priority to Japanese Patent Application No. 2010-100175 filed on Apr. 23, 2010 the disclosure of which, including the specification, drawings and abstract, is incorporated herein by reference in its entirety.

BACKGROUND OF THE INVENTION

1. Field of the Invention

The invention relates to a speed change gear.

2. Discussion of Background

A speed change gear is used as a speed reducing gear or a speed increasing gear that changes the speed of rotation input from a motor, or the like. As such a speed change gear, there is a known speed reducing gear that uses a planet gear mechanism in order to obtain a high change gear ratio, which is, for example, described in Japanese Utility Model Application Publication No. 60-127150 (JP-U-60-127150). The speed reducing gear described in JP-U-60-127150 oscillatingly rotates a pair of planet gears in the same phase with the rotation of an input shaft and then outputs the differences in rotational speed between external gears of the respective planet gears and internal gears meshed respectively with the external gears as a speed reducing ratio. A speed reducing gear described in Japanese Patent Application Publication No. 2002-266955 (JP-A-2002-266955) oscillatingly rotates a planet gear with the rotation of an input shaft and then transmits and outputs only the axial rotation component of the planet gear. The thus configured speed reducing gears are able to obtain a high change gear ratio with the use of a single-stage planet gear mechanism.

However, as the change gear ratio of the speed change gear is increased, the transmission efficiency of driving force decreases. Therefore, the size of the speed change gear is increased in order to obtain a higher change gear ratio. In addition, in the case of a speed increasing gear that requires particularly high transmission efficiency, there is a possibility that self-lock may occur. Accordingly, a speed increasing ratio obtained from a single-stage gear is limited. Then, as described in Japanese Patent Application Publication No. 2010-019286 (JP-A-2010-019286), there is a known configuration where speed reducing gear units having the same configuration are arranged in tandem. The speed reducing gear described in JP-A-2010-019286 includes speed reducing gear units in multiple stages to increase the overall change gear ratio.

However, in the speed reducing gear described in JP-A-2010-019286, although driving forces transmitted by the respective speed reducing gear units coupled to each other are different from each other, the speed reducing gear units have the same configuration. Therefore, transmittable driving force of the speed reducing gear is limited as a whole. Furthermore, because a member, or the like, that couples the speed reducing gear units is required, the size of the speed reducing gear increases in the direction along the input/output axis.

SUMMARY OF THE INVENTION

The invention is made in the light of the above-described circumstances, and it is an object of the invention to provide a speed change gear that is able to obtain a high change gear ratio and to improve the transmission efficiency and that may be reduced in size with a simple configuration.

According to a feature of an example of the invention, a speed change gear includes: a housing that has a plurality of internal gears having different inside diameters on its inner peripheral surface; and a plurality of change gear units that are respectively arranged at locations in a direction along an input/output axis, at which the plurality of internal gears are formed. Then, the plurality of change gear units include one side change gear unit and the other side change gear unit that are next to each other, and a rotating member of the one side change gear unit is coupled to an eccentric member of the other side change gear unit.

Each "change gear unit" is a unit that is formed of a rotating member, an eccentric member and an oscillating member. Then, for example, when the eccentric member is located on an input shaft side, only the axial rotation component of the oscillating rotation of the oscillating member resulting from the rotation of the eccentric member is transmitted to the rotating member that is located on an output shaft side. On the other hand, when the rotating member is located on the input shaft side, the rotation of the rotating member is transmitted as the axial rotation component of the oscillating member to thereby rotate the eccentric member located on the output shaft side using the oscillating rotation of the oscillating member. Thus, each change gear unit changes the rotational speed between a member on the input shaft side and a member on the output shaft side at a change gear ratio based on the difference in the number of teeth between the internal gear of the housing and an external gear of the oscillating member.

The speed change gear according to the invention includes a plurality of the above-described change gear units arranged in the direction along the input/output axis. Then, the plurality of thus configured change gear units are coupled in tandem with each other to thereby make it possible to obtain a high change gear ratio. Furthermore, the internal gears with which the external gears of the respective oscillating members are in mesh are formed on the inner peripheral surface of the housing and have different inside diameters.

In order to deal with input driving force, an increase in driving force due to a gear change, and the like, the speed change gear requires a mechanical strength corresponding to the driving force. Therefore, in a case where the speed is reduced in order to generate high driving force, for example, the pitch diameters of the meshed internal gear and external gear may be increased to suppress pressure exerted on the tooth surfaces. However, when a plurality of speed reducing gears having different pitch diameters are coupled in tandem with each other as in the case of the related art, there is a possibility that the number of components of the speed change gear increases and the size of the speed change gear increases as a whole.

Then, with the above configuration, the change gear units corresponding to the respective inside diameters of the internal gears are arranged in correspondence with the internal gears that have different inside diameters and that are formed on the inner peripheral surface of the same housing. Thus, it is possible to obtain a mechanical strength corresponding to transmitted driving force. Thus, even when the change gear units are arranged so as to be coupled to each other in order to obtain a high change gear ratio, it is possible to deal with driving force transmitted in each of the change gear units. Furthermore, in comparison with the case where the speed reducing gears having the same configuration are coupled in tandem with each other as in the case of the related art, the number of components of the speed change gear may be reduced and the speed change gear may be simplified. Thus, in a drive state where the speed change gear is transmitting driving force, a mechanical loss due to transmission of driving force is reduced to make it possible to improve the transmission efficiency.

In addition, a plurality of change gear units are respectively arranged at locations of the housing in a direction along the input/output axis, at which the plurality of internal gears are formed. Thus, it is possible to obtain a high change gear ratio as in the case of the configuration where a plurality of speed reducing gears are coupled to each other. Then, in this case, because the change gear units are directly coupled to each other, the size of the speed change gear may be reduced as a whole. In addition, there is a generally known fact that the transmission efficiency reduces if a higher change gear ratio is attempted to be obtained using a set of speed reducing gears. Then, the plurality of change gear units are set so as to obtain a predetermined change gear ratio to thereby make it possible to maintain a high transmission efficiency in each of the change gear units. Therefore, it is possible to improve the transmission efficiency even with the same change gear ratio as that in the related art.

According to another feature of an example of the invention, at least one of the plurality of change gear units includes a plurality of the eccentric members that are provided next to each other in the direction along the input/output axis; and a plurality of the oscillating members that are respectively supported by the plurality of eccentric members. In addition, in the at least one of the plurality of change gear units, the rotating member has a pin, and each of the oscillating members has an insertion hole through which the pin is inserted. Thus, it is possible to disperse a load on the external gears of the respective oscillating members in the at least one of the plurality of change gear units. Thus, with the at least one of the plurality of change gear units, it is possible to increase a mechanically transmittable maximum driving force.

According to a further feature of an example of the invention, the plurality of eccentric members of the at least one of the change gear units are coupled to one of the input shaft and the output shaft such that the oscillating members respectively supported by the plurality of eccentric members are arranged at equiangular positions in a circumferential direction of rotation about the input/output axis. That is, when the change gear unit includes two oscillating members, two eccentric members are coupled to each other in the direction along the input/output axis such that the oscillating members are arranged at an interval of 180 degrees; when the change gear unit includes three oscillating members, three eccentric members are coupled to each other in the direction along the input/output axis such that the oscillating members are arranged at an interval of 120 degrees. Thus, it is possible to cancel an imbalance of rotation due to rotation of the eccentric members. Thus, it is possible to suppress vibrations in the change gear units and the speed change gear as a whole.

According to another feature of the invention, by way of example, the plurality of change gear units arranged next to each other include one side change gear unit and the other side change gear unit, the eccentric member of the other side change gear unit is integrally coupled to the rotating member of the one side change gear unit at a location eccentric in a radial direction of the rotating member of the one side change gear unit such that an outer peripheral surface of the rotating member of the one side change gear unit rotatably supports the oscillating member of the other side change gear unit. With the above configuration, the rotating member of the one side change gear unit has the function as the eccentric member of the other side change gear unit and is formed as a single member. Thus, the number of components may be reduced.

Furthermore, in comparison with the case where the plurality of change gear units are simply coupled to each other in the direction along the input/output axis, the axial length of the speed change gear along the input/output axis may be reduced. Therefore, the size of the speed change gear may be reduced as a whole.

Further by way of example, according to another aspect of the invention, an outer peripheral surface of the rotating member of the one side change gear unit is supported by the pin of the rotating member of the other side change gear unit. In addition, in at least the other side change gear unit, the rotating member has the pin. That is, the oscillating member of the other side change gear unit has the insertion hole. With the above configuration, the rotating member of the one side change gear unit is indirectly supported by the housing via the other side change gear unit without requiring, for example, a support member, or the like, that is arranged on the outer peripheral side of the rotating member. Thus, because the above-described support member is not required, the number of components may be reduced.

In addition, with the above configuration, the rotating member of the one side change gear unit may be supported not by the pin but, for example, by a crankshaft, or the like, that has an eccentric member via a bearing. In such a case, both end portions of the pin of the rotating member of the other side change gear unit are supported by the rotating member of the one side change gear unit and the rotating member of the other side change gear unit. The pin of the rotating member is inserted in the insertion hole of the oscillating member, and outputs or receives the axial rotation component of the oscillatingly rotating oscillating member. Therefore, as the rotational speed of the eccentric member increases in a state where the speed change gear is driven, the rotating member may be influenced by the oscillating rotation of the oscillating member to wobble accordingly. Then, with the above configuration, the pin of the rotating member is supported at both ends. This configuration prevents the wobbling of the rotating member, and the like, and may be applied to transmitting driving force at a high rotational speed.

According to a further feature of an example of the invention, the speed change gear further includes a pin support member that supports the pin inserted through the insertion hole of the oscillating member. The pin support member is arranged at a side toward which the pin protrudes with respect to the eccentric member of the change gear unit. Thus, the eccentric member is interposed between the rotating member and the pin support member. In addition, the pin support member, as well as the rotating member, is supported by the housing rotatably about the input/output axis.

With the above configuration, both end portions of the pin of the rotating member are supported by the rotating member and the pin support member. As described above, as the rotational speed of the eccentric member increases in a state where the speed change gear is driven, the pin of the rotating member may be influenced by the oscillating rotation of the oscillating member to cause wobbling accordingly. Then, the pin of the rotating member is supported at both ends using the pin support member. This configuration prevents the wobbling of the rotating member, and the like, and may be applied to transmitting driving force at a high rotational speed.

According to another feature of the invention, by way of example, the pin support member supports the pin of the rotating member of the at least one of the change gear units, which is a high rotational speed change gear unit in a state where the speed change gear is driven. For example, if the number of teeth of the internal gear is larger than the number of teeth of the external gear, in the speed change gear, one shaft member coupled to the eccentric member-side of the change gear unit rotates at a speed higher than the other shaft member coupled to the rotating member-side. That is, if the one shaft member is an input shaft, the speed change gear is a speed reducing gear, whereas, if the one shaft member is an output shaft, the speed change gear is a speed increasing gear.

Then, in the above speed change gear, in a state where the speed change gear is driven, one of the plurality of change gear units, located on the one shaft member-side, rotates at the highest rotational speed. Here, as described above, the rotating member may be influenced by the oscillating rotation of the oscillating member with an increase in the rotational speed of the eccentric member to wobble. Then, at least the pin of the highest rotational speed-side rotating member within the plurality of change gear units is supported by the pin support member. This configuration prevents the wobbling of the rotating member, and the like, and may be applied to transmitting driving force at a higher rotational speed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5 is a table that shows the transmission ratio, the speed reduction efficiency and the speed increasing efficiency with respect to the number of change gear units (n);

DETAILED DESCRIPTION OF EMBODIMENTS

Hereinafter, embodiments of the invention will be described with reference to the accompanying drawings.

Figure 1:
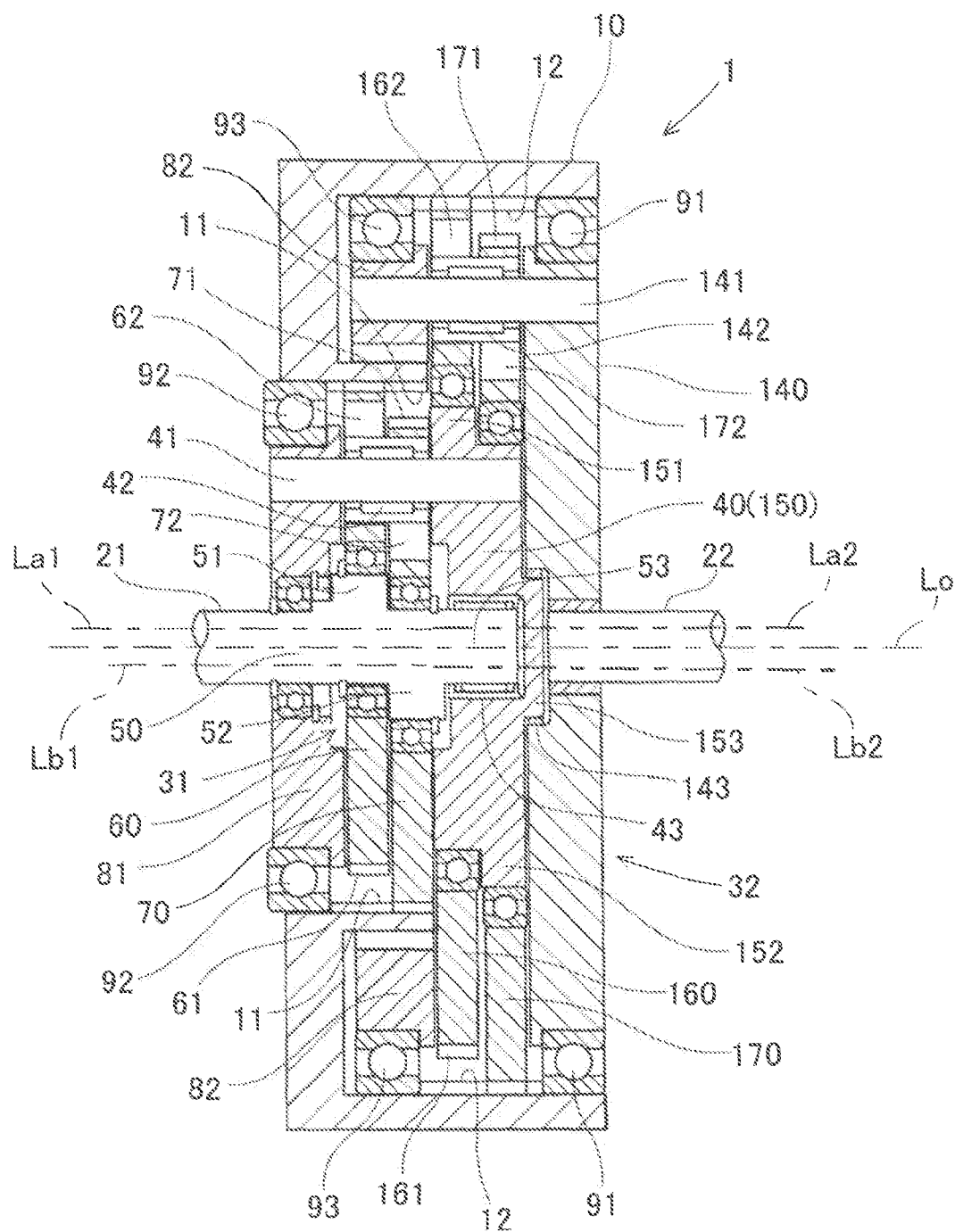
FIG. 1 is a sectional view that shows the configuration of a speed reducing gear according to a first embodiment.
Figure 2:
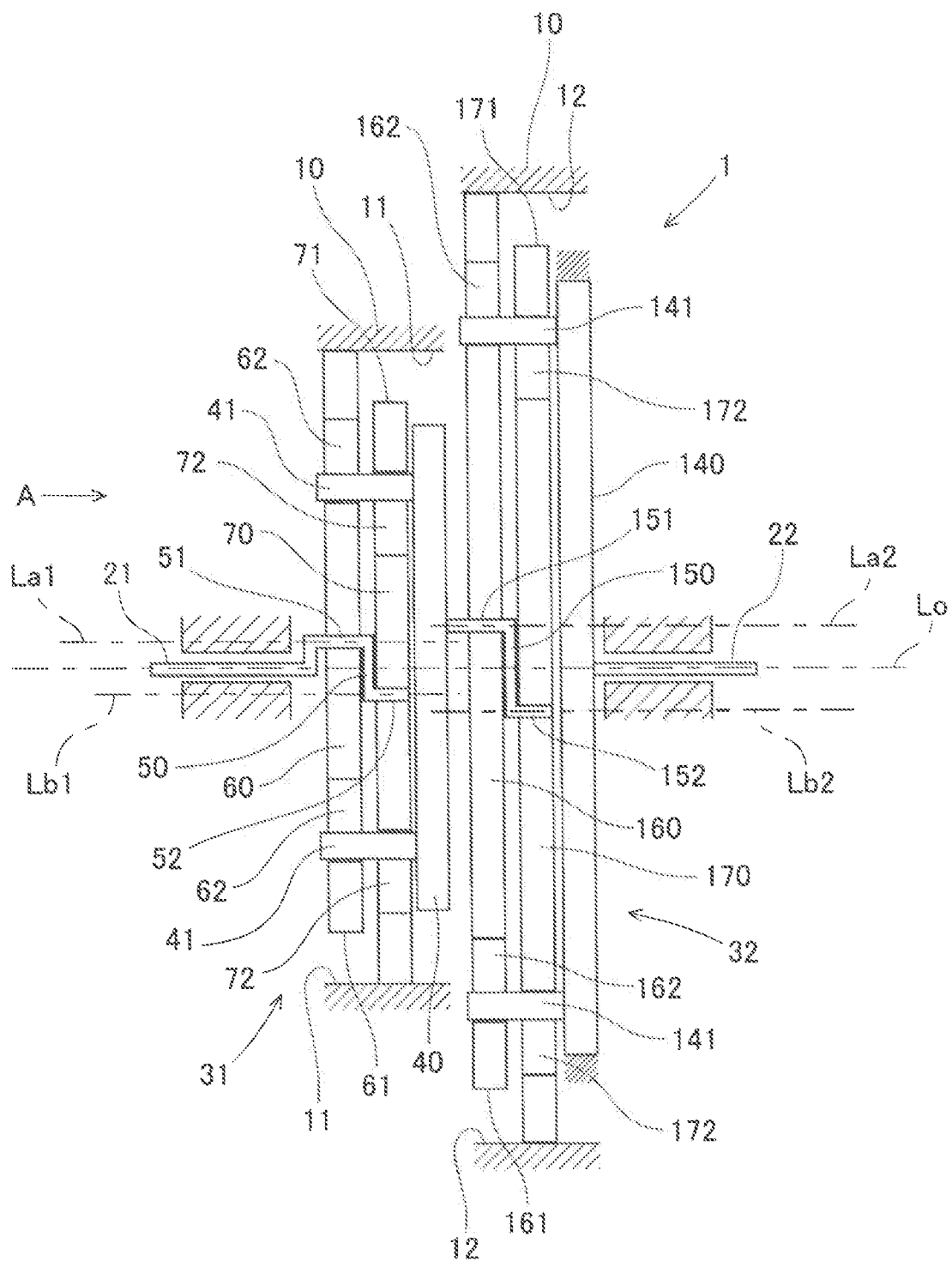
FIG. 2 is a conceptual view that shows the basic configuration of the speed reducing gear.
Figure 3:
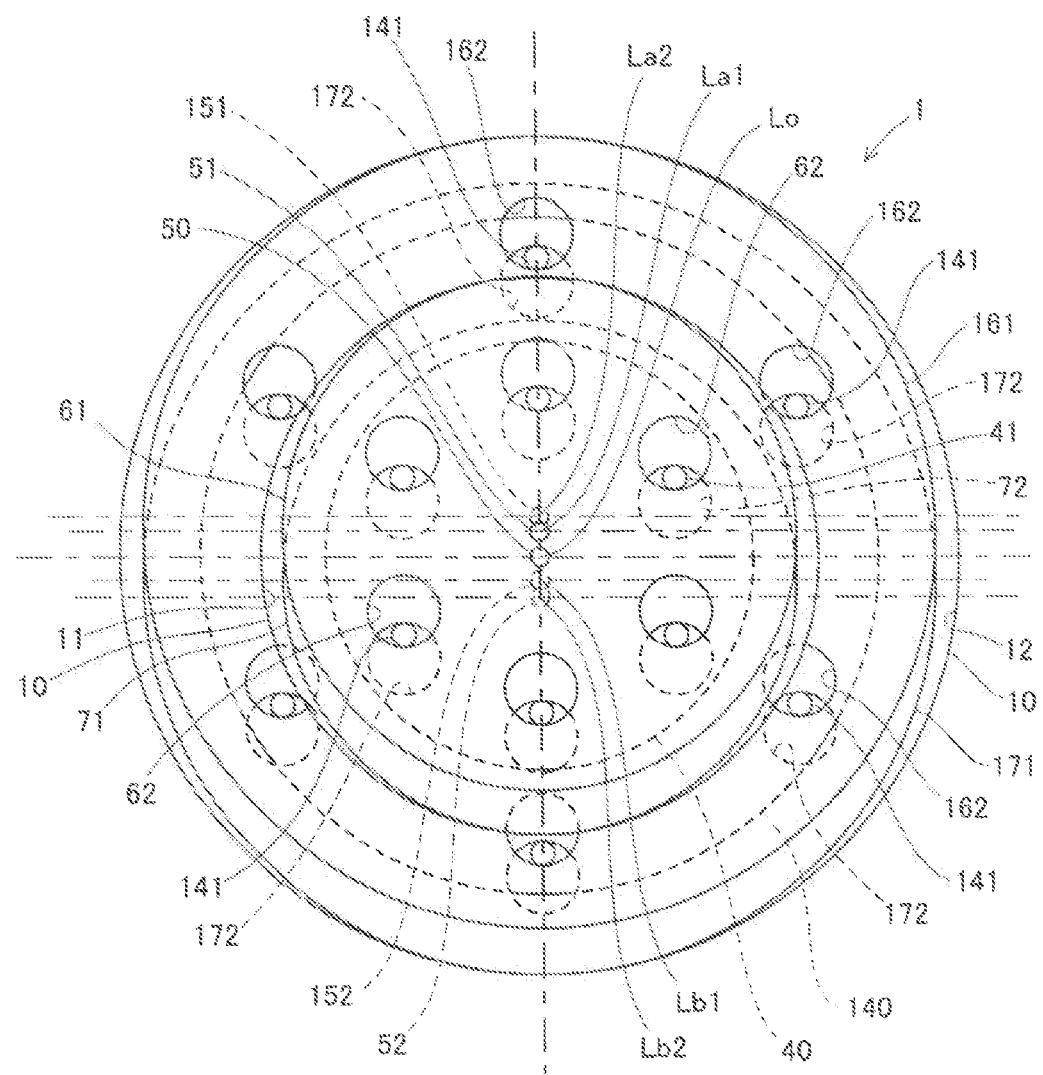
FIG. 3 is a view when seen in the direction of the arrow A in FIG. 2 through part of a first change gear unit.
Figure 4:
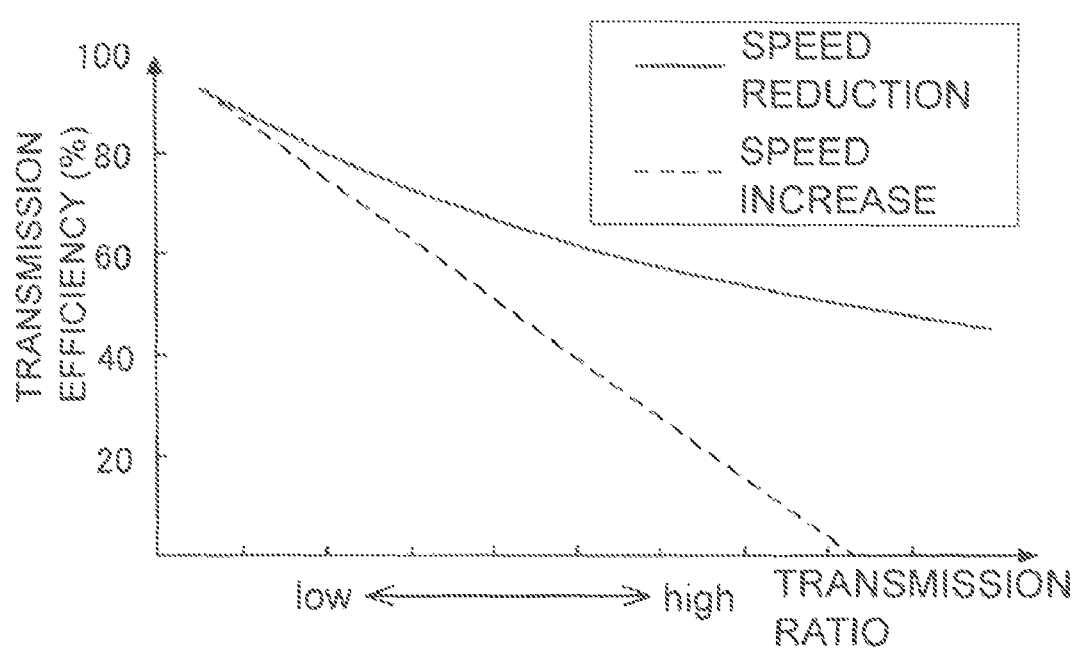
FIG. 4 is a graph that shows the correlation between the transmission ratio and the transmission efficiency.

A speed reducing gear 1 according to a first embodiment will be described with reference to FIG. 1 to FIG. 5. FIG. 1 is a sectional view that shows the configuration of the speed reducing gear 1. FIG. 2 is a conceptual view that shows the basic configuration of the speed reducing gear 1. FIG. 3 is a view when seen in the direction of the arrow A in FIG. 2 through part of a first change gear unit 31. FIG. 4 is a graph that shows the correlation between the transmission ratio and the transmission efficiency. FIG. 5 is a table that shows the transmission ratio, the speed reduction efficiency and the speed increasing efficiency with respect to the number of change gear units (n). Note that, in the sectional view of FIG. 1, some parts of the configuration of the speed reducing gear 1, for example, pins 41, 141 located on the lower side of FIG. 1 are omitted for the sake of convenience.

The speed reducing gear 1 is mainly formed of a housing 10, an input shaft member 21, an output shaft member 22, the first change gear unit 31, a second change gear unit 32, a first pin support member 81, a second pin support member 82 and bearings 91 to 93.

As shown in FIG. 1, the housing 10 is a case that supports the input shaft member 21 and the output shaft member 22 rotatably about a common input/output axis Lo, and that accommodates a plurality of change gear units, that is, the first and second change gear units 31 and 32. In addition, the housing 10 has a first internal gear 11 and a second internal gear 12 on its inner peripheral surface. The first internal gear 11 and the second internal gear 12 extend in a direction along the input/output axis Lo, and have different inside diameters. The first internal gear 11 is located at one side (left side in FIG. 1 and FIG. 2) of the speed reducing gear 1, with respect to the second internal gear 12. The inside diameter of the first internal gear 11 is smaller than the inside diameter of the second internal gear 12.

The input shaft member 21 is an input shaft that is coupled to a motor (not shown), and that is rotated when the motor is driven. The input shaft member 21 is rotatably supported by the housing 10 via the first pin support member 81 (described later). Thus, the input shaft member 21 is rotatable about the input/output axis Lo. In addition, the input shaft member 21 is arranged at one side of the speed reducing gear 1, and the other side (right side in FIG. 1 and FIG. 2) end portion of the input shaft member 21 is coupled to a crankshaft 50 of the first change gear unit 31 (described later).

The output shaft member 22 is an output shaft that outputs rotation of which the speed is reduced by the first and second change gear units 31 and 32. The output shaft member 22 is arranged at the other side of the speed reducing gear 1, and one side end portion of the output shaft member 22 is coupled to a rotating member 140 of the second change gear unit 32 (described later). That is, the output shaft member 22 is rotatably supported by the housing 10 via the rotating member 140 of the second change gear unit 32 (described later). Thus, the output shaft member 22 is rotatable about the input/output axis Lo.

As shown in FIG. 1 and FIG. 2, the first change gear unit 31 is formed of a rotating member 40, the crankshaft 50, a first oscillating member 60 and a second oscillating member 70. Similarly, the second change gear unit 32 is formed of the rotating member 140, a crankshaft 150, a first oscillating member 160 and a second oscillating member 170. However, in the present embodiment, the rotating member 40 of the first change gear unit 31 and the crankshaft 150 of the second change gear unit 32 are integrally formed and serve as a single member. Then, in FIG. 1, the crankshaft 150 of the second change gear unit 32 is indicated as the rotating member 40. In addition, in the conceptual view of FIG. 2, the rotating member 40 and the crankshaft 150 are separately shown.

The thus configured first and second change gear units 31 and 32 change the speed (reduce the speed, in the present embodiment) of rotation input into the input-side crankshafts 50 and 150 and then output the rotation from the output-side rotating members 40 and 140. In addition, in the speed reducing gear 1, the first change gear unit 31 is a change gear unit arranged at the input side, and the second change gear unit 32 is a change gear unit arranged at the output side. That is, the first change gear unit 31 and the second change gear unit 32 are arranged so as to be next to each other in the direction along the input/output axis Lo. The first change gear unit 31 corresponds to "one side change gear unit" according to the invention, and the second change gear unit 32 corresponds to "the other side change gear unit" according to the invention. Hereinafter, the configuration of the first change gear unit 31 will be described.

As described above, the rotating member 40 is a disc-shaped member that is integrally formed with the crankshaft 150 of the second change gear unit 32. As shown in FIG. 1, the rotating member 40 is supported by the housing 10 via the rotating member 140 of the second change gear unit 32 rotatably about the input/output axis Lo. The rotating member 40 of the first change gear unit 31 has the pins 41, roller bearings 42, a recessed portion 43, a first eccentric portion 151, a second eccentric portion 152 and a projecting portion 153. The first eccentric portion 151 and the second eccentric portion 152 correspond to an "eccentric member" according to the invention.

The pins 41 are formed so as to protrude from one side disc surface of the rotating member 40 in the direction along the input/output axis Lo. As shown in FIG. 3, the six pins 41 are fixed to the one side disc surface of the rotating member 40 so as to be arranged at equiangular positions in the circumferential direction of the rotating member 40. Each of the pins 41 is a columnar member that is fixed to the rotating member 40. Each of the roller bearings 42 is a cylindrical bearing member that is rotatably fitted around a corresponding one of the pins 41. Each pin 41 is inserted through insertion holes 62 and 72 of the first and second oscillating members 60 and 70 (described later). Part of each roller bearing 42 fitted around a corresponding one of the pins 41 is in contact with the inner peripheral surfaces of these insertion holes 62 and 72.

The recessed portion 43 is a cylindrical inner surface. The recessed portion 43 is formed in the rotating member 40 so as to extend from the disc surface at the one side of the speed reducing gear 1 toward the other side. The recessed portion 43 centers on the input/output axis Lo. The projecting portion 53 is formed at the output side end portion of the crankshaft 50 of the first change gear unit 31 (described later). The projecting portion 53 is inserted in the recessed portion 43. The recessed portion 43 supports the crankshaft 50 such that the crankshaft 50 is rotatable relative to the recessed portion 43.

The first eccentric portion 151 and second eccentric portion 152 of the rotating member 40 are located on a side toward which the pins 141 protrude (left side in FIG. 1) with respect to the rotating member 140 of the second change gear unit 32. The sectional shape of the first eccentric portion 151 is a perfect circle that centers on a first eccentric axis La2 of the second change gear unit 32, which is eccentric in the radial direction of the rotating member 40 with respect to the input/output axis Lo. The sectional shape of the second eccentric portion 152 is a perfect circle that centers on a second eccentric axis Lb2 of the second change gear unit 32, which is eccentric in the radial direction of the rotating member 40 with respect to the input/output axis Lo, as in the case of the first eccentric portion 151.

The first and second eccentric portions 151 and 152 rotatably support the first oscillating member 160 and second oscillating member 170 of the second change gear unit 32, respectively. In this way, the rotating member 40 of the first change gear unit 31 is configured such that the first and second eccentric portions 151 and 152 of the second change gear unit 32 are integrally provided at locations eccentric in the radial direction.

The projecting portion 153 is a cylindrical portion that projects from the other side disc surface of the rotating member 40 toward the output side and that centers on the input/output axis Lo. As shown in FIG. 1, the projecting portion 153 is inserted in a recessed portion 143 of the rotating member 140 of the second change gear unit 32 (described later). Thus, the rotating member 40 is supported so as to be rotatable relative to the rotating member 140 of the second change gear unit 32. In this way, the rotating member 40 of the first change gear unit 31 also serves as the crankshaft 150 of the second change gear unit 32, which is integrally formed with the rotating member 40.

The crankshaft 50 has a first eccentric portion 51, a second eccentric portion 52 and the projecting portion 53. The first eccentric portion 51 has an eccentric shape that is eccentric with respect to the axis of the crankshaft 50 (input/output axis Lo). The first eccentric portion 51 is arranged on a side toward which the pins 41 protrude (left side in FIG. 1) with respect to the rotating member 40, and is integrally formed with the crankshaft 50. In addition, the sectional shape of the first eccentric portion 51 is a perfect circle that centers on a first eccentric axis La1 that is eccentric in the radial direction of the crankshaft 50 with respect to the input/output axis Lo. The first eccentric portion 51 rotates about the input/output axis Lo as the crankshaft 50 rotates about the input/output axis Lo.

The second eccentric portion 52 as well as the first eccentric portion 51 has an eccentric shape that is eccentric with respect to the axis of the crankshaft 50 (input/output axis Lo). The second eccentric portion 52 is arranged on a side toward which the pins 41 protrude (left side in FIG. 1) with respect to the rotating member 40, and is arranged on the output side with respect to the first eccentric portion 51 (right side of the first eccentric portion 51 in FIG. 1). The second eccentric portion 52 and the first eccentric portion 51 are coupled to each other, and are integrally formed with the crankshaft 50. In addition, the sectional shape of the second eccentric portion 52 has a perfect circle that centers on a second eccentric axis Lb1 that is eccentric in the radial direction of the crankshaft 50 with respect to the input/output axis Lo. The second eccentric portion 52 rotates about the input/output axis Lo as the crankshaft 50 rotates about the input/output axis Lo.

The first eccentric portion 51 and the second eccentric portion 52 are coupled to each other such that their eccentric directions with respect to the input/output axis Lo are opposite to each other. In other words, in the present embodiment, the first eccentric portion 51 and the second eccentric portion 52 that are two eccentric members are coupled to each other at an interval of 180 degrees so as to be arranged at equiangular positions in the circumferential direction of rotation about the input/output axis Lo.

The projecting portion 53 has a columnar shape that centers on the input/output axis Lo, and is formed so as to protrude from an end surface of the second eccentric portion 52 at the output side end portion of the crankshaft 50. The projecting portion 53 is inserted in the recessed portion 43 of the rotating member 40, and is rotatably supported by the rotating member 40. Thus, the crankshaft 50 is supported via the rotating member 40 by the rotating member 140 of the second change gear unit 32 that supports the rotating member 40.

In addition, one side (left side in FIG. 1) end portion of the crankshaft 50 of the first change gear unit 31 is coupled to the input shaft member 21. Thus, the crankshaft 50 rotates about the input/output axis Lo as the input shaft member 21 rotates. In addition, with the above configuration, the first eccentric portion 51 and second eccentric portion 52 of the first change gear unit 31 that serves as the one side change gear unit are coupled to the input shaft member 21 via the crankshaft 50.

The first oscillating member 60 has an annular shape. As shown in FIG. 1 and FIG. 2, the first oscillating member 60 is a planet gear that has an external gear 61 and insertion holes 62 and that is rotatably supported on the outer peripheral side of the first eccentric portion 51. The external gear 61 is formed on the outer peripheral surface of the first oscillating member 60, and is in mesh with the first internal gear 11 of the housing 10. Each of the pins 41 of the rotating member 40 is inserted in a corresponding one of the insertion holes 62. The inside diameter of each insertion hole 62 of the first oscillating member 60 is substantially equal to the sum of the diameter of the inserted pin 41 and the eccentric amount (distance between the input/output axis Lo and the first eccentric axis La1) of the first oscillating member 60. Here, because the roller bearing 42 is fitted around each pin 41 in the present embodiment, the above "diameter of each pin 41" substantially corresponds to the diameter of each roller bearing 42.

More specifically, the inner peripheral surfaces of the insertion holes 62 of the first oscillating member 60 contact the outer peripheral surfaces of the roller bearings 42 fitted around the respective pins 41 to transmit driving force in a state where the speed reducing gear 1 is driven. With the above configuration, the first oscillating member 60 oscillatingly rotates so as to revolve around the input/output axis Lo while rotating about the first eccentric axis La1 as the first eccentric portion 51 rotates about the input/output axis Lo. Then, the axial rotation component of the oscillatingly rotating first oscillating member 60 is transmitted to the pins 41, and the rotating member 40 rotates at the rotational speed at which the first oscillating member 60 rotates on its axis.

The second oscillating member 70 as well as the first oscillating member 60 has an annular shape. As shown in FIG. 1 and FIG. 2, the second oscillating member 70 is a planet gear that has an external gear 71 and insertion holes 72, and that is rotatably supported on the outer peripheral side of the second eccentric portion 52. The external gear 71 is formed on the outer peripheral surface of the second oscillating member 70, and is in mesh with the first internal gear 11 of the housing 10. Each of the pins 41 of the rotating member 40 is inserted in a corresponding one of the insertion holes 72. The inside diameter of each insertion hole 72 of the second oscillating member 70 is substantially equal to the sum of the diameter of each inserted pin 41 and the eccentric amount (distance between the input/output axis Lo and the second eccentric axis Lb1) of the second oscillating member 70. The "diameter of each pin 41" corresponds to the diameter of each roller bearing 42 in the present embodiment as described above.

More specifically, the inner peripheral surfaces of the insertion holes 72 of the second oscillating member 70 contact the outer peripheral surfaces of the roller bearings 42 fitted around the respective pins 41 to transmit driving force in a state where the speed reducing gear 1 is driven. With the above configuration, the second oscillating member 70 oscillatingly rotates so as to revolve around the input/output axis Lo while rotating about the second eccentric axis Lb1 as the second eccentric portion 52 rotates about the input/output axis Lo. Then, the axial rotation component of the oscillatingly rotating second oscillating member 70 is transmitted to the pins 41, and the rotating member 40 rotates at the rotational speed at which the second oscillating member 70 rotates on its axis.

In addition, the first eccentric portion 51 and second eccentric portion 52 of the crankshaft 50 are coupled to each other so as to be arranged at equiangular positions in the circumferential direction of rotation about the input/output axis Lo. Thus, the first and second oscillating members 60 and 70 that are respectively supported on the first and second eccentric portions 51 and 52 are located at equiangular positions in the circumferential direction of rotation about the input/output axis Lo. In a state where the speed reducing gear 1 is driven, the first and second eccentric portions 51 and 52 rotate with the rotation of the crankshaft 50 and then the first and second oscillating members 60 and 70 oscillatingly rotate with the rotation of the first and second eccentric portions 51 and 52. In this case, the respective rotation axes (first eccentric axis La1 and second eccentric axis Lb1) of the first and second oscillating members 60 and 70 rotate around the input/output axis Lo while maintaining the symmetrical positions with respect to the input/output axis Lo due to the above positional relationship.

As described above, the first change gear unit 31 is formed of the rotating member 40, the crankshaft 50, the first oscillating member 60 and the second oscillating member 70. In addition, the second change gear unit 32 is provided at the output side of the speed reducing gear 1 so as to be next to the first change gear unit 31. The second change gear unit 32 is formed of the rotating member 140, the crankshaft 150 (the rotating member 40 of the first change gear unit 31), the first oscillating member 160 and the second oscillating member 170, which have shapes different from those of the first change gear unit 31.

The rotating member 140 of the second change gear unit 32 is a disc-shaped member that is supported by the housing 10 via the bearing 91 so as to be rotatable about the input/output axis Lo. The rotating member 140 of the second change gear unit 32 has the pins 141, roller bearings 142 and the recessed portion 143. Because the pins 141 and the roller bearings 142 respectively correspond to the pins 41 and roller bearings 42 of the rotating member 40 of the first change gear unit 31, the detailed description thereof is omitted.

The recessed portion 143 is a cylindrical inner surface. The recessed portion 143 is formed in the rotating member 140 so as to extend from the disc surface at the one side of the speed reducing gear 1 toward the other side. The recessed portion 143 centers on the input/output axis Lo. The projecting portion 153 of the rotating member 40 of the first change gear unit 31 is inserted in the recessed portion 143. The recessed portion 143 supports the rotating member 40 of the first change gear unit 31, which is integrally formed with the crankshaft 150 of the second change gear unit 32, such that the rotating member 40 is rotatable relative to the recessed portion 143. In addition, the other side disc surface of the rotating member 140 is coupled to the output shaft member 22.

In addition, the crankshaft 150 of the second change gear unit 32 is integrally formed with the rotating member 40 of the first change gear unit 31 as described above. In the present embodiment, when the crankshaft 150 is formed in this way, the rotating member 40 of the first change gear unit 31 is coupled to the first eccentric portion 151 and the second eccentric portion 152 that correspond to the eccentric members of the second change gear unit 32. Thus, the second change gear unit 32 is coupled to the input shaft member 21 via the first change gear unit 31.

The first oscillating member 160 has an annular shape. As shown in FIG. 1 and FIG. 2, the first oscillating member 160 is a planet gear that has an external gear 161 and insertion holes 162, and that is rotatably supported on the outer peripheral side of the first eccentric portion 151. The external gear 161 is formed on the outer peripheral surface of the first oscillating member 160, and is able to be in mesh with the second internal gear 12 of the housing 10. Each of the pins 141 of the rotating member 140 is inserted in a corresponding one of the insertion holes 162. The inside diameter of each insertion hole 162 of the first oscillating member 160 is substantially equal to the sum of the diameter of the inserted pin 141 and the eccentric amount (distance between the input/output axis Lo and the first eccentric axis La2) of the first oscillating member 160. Here, because the roller bearing 142 is fitted around each pin 141 in the present embodiment, the above "diameter of each pin 141" substantially corresponds to the diameter of each roller bearing 142.

More specifically, the inner peripheral surfaces of the insertion holes 162 of the first oscillating member 160 contact the outer peripheral surfaces of the roller bearings 142 fitted around the pins 141 to transmit driving force in a state where the speed reducing gear 1 is driven. With the above configuration, the first oscillating member 160 oscillatingly rotates so as to revolve around the input/output axis Lo while rotating about the first eccentric axis La2 as the first eccentric portion 151 rotates about the input/output axis Lo. Then, the axial rotation component of the oscillatingly rotating first oscillating member 160 is transmitted to the pins 141, and the rotating member 140 rotates at the rotational speed at which the first oscillating member 160 rotates on its axis.

The second oscillating member 170 as well as the first oscillating member 160 has an annular shape. As shown in FIG. 1 and FIG. 2, the second oscillating member 170 is a planet gear that has an external gear 171 and insertion holes 172, and that is rotatably supported on the outer peripheral side of the second eccentric portion 152. The external gear 171 is formed on the outer peripheral surface of the second oscillating member 170, and is in mesh with the second internal gear 12 of the housing 10. Each of the pins 141 of the rotating member 140 is inserted in a corresponding one of the insertion holes 172. The inside diameter of each insertion hole 172 of the second oscillating member 170 is substantially equal to the sum of the diameter of each inserted pin 141 and the eccentric amount (distance between the input/output axis Lo and the second eccentric axis Lb2) of the second oscillating member 170. The "diameter of each pin 141" corresponds to the diameter of each roller bearing 142 in the present embodiment as described above.

More specifically, the inner peripheral surfaces of the insertion holes 172 of the second oscillating member 170 contact the outer peripheral surfaces of the roller bearings 142 fitted around the respective pins 141 to transmit driving force in a state where the speed reducing gear 1 is driven. With the above configuration, the second oscillating member 170 oscillatingly rotates so as to revolve around the input/output axis Lo while rotating around the second eccentric axis Lb2 as the second eccentric portion 152 rotates about the input/output axis Lo. Then, the axial rotation component of the oscillatingly rotating second oscillating member 170 is transmitted to the pins 141, and the rotating member 140 rotates at the rotational speed at which the second oscillating member 170 rotates on its axis.

In addition, the first eccentric portion 151 and second eccentric portion 152 of the crankshaft 150 that is integrally formed with the rotating member 40 of the first change gear unit 31 are coupled to each other so as to be arranged at equiangular positions in the circumferential direction of rotation about the input/output axis Lo. Thus, the first and second oscillating members 160 and 170 that are respectively supported on the first and second eccentric portions 151 and 152 are located at equiangular positions in the circumferential direction of rotation about the input/output axis Lo.

In a state where the speed reducing gear 1 is driven, the first and second eccentric portions 151 and 152 rotate with the rotation of the crankshaft 150 and then the first and second oscillating members 160 and 170 oscillatingly rotate with the rotation of the first and second eccentric portions 151 and 152. In this case, the respective rotation axes (first eccentric axis La2 and second eccentric axis Lb2) of the first and second oscillating members 160 and 170 rotate around the input/output axis Lo while maintaining the symmetrical positions with respect to the input/output axis Lo due to the above positional relationship.

With the above configuration, inside the housing 10, the first change gear unit 31 and the second change gear unit 32 are located so as to be next to each other in the direction along the input/output axis Lo. Then, the external gear 61 of the first oscillating member 60 and the external gear 71 of the second oscillating member 70 in the first change gear unit 31 are in mesh with the first internal gear 11. In contrast to this, the external gear 161 of the first oscillating member 160 and the external gear 171 of the second oscillating member 170 in the second change gear unit 32 are in mesh with the second internal gear 12.

In this way, the first change gear unit 31 and the second change gear unit 32 are respectively arranged at locations, at which the first and second internal gears 11 and 12 are formed, in the direction along the input/output axis Lo, such that the external gears 61 and 71 and the external gears 161 and 171 are respectively in mesh with the first internal gear 11 and the second internal gear 12 that have different inside diameters. Then, the first and second change gear units 31 and 32 are respectively in mesh with the first internal gear 11 and the second internal gear 12 and change the speed of rotation transmitted from the input shaft member 21 to the output shaft member 22.

The first pin support member 81 is a disc-shaped member that is supported by the housing 10 via the bearing 92 so as to be rotatable about the input/output axis Lo. The first pin support member 81 is arranged on a side toward which the pins 41 of the rotating member 40 protrude with respect to the first and second eccentric portions 51 and 52 of the first change gear unit 31. Then, the first pin support member 81 has pin holes that are equal in number to the plurality of pins 41. The end portions of the pins 41 that are inserted through the insertion holes 62 and 72 of the first and second oscillating members 60 and 70 are press-fitted or loosely fitted in the pin holes. Thus, the first pin support member 81 supports the six pins 41 fixed to the rotating member 40, and rotates at the same rotational speed as the rotating member 40 with the rotation of the rotating member 40. In addition, the first pin support member 81 rotatably supports the input shaft member 21 via a bearing arranged on the cylindrical inner surface of the first pin support member 81.

The second pin support member 82 is a disc-shaped member that is supported by the housing 10 via the bearing 93 so as to be rotatable about the input/output axis Lo. The second pin support member 82 is arranged on a side toward which the pins 141 of the rotating member 140 protrude with respect to the first and second eccentric portions 151 and 152 of the second change gear unit 32. Then, the second pin support member 82 has pin holes that are equal in number to the plurality of pins 141. The end portions of the pins 141 that are inserted through the insertion holes 162 and 172 of the first and second oscillating members 160 and 170 are press-fitted or loosely fitted in the pin holes. Thus, the second pin support member 82 supports the six pins 141 fixed to the rotating member 140, and rotates at the same rotational speed as the rotating member 140 with the rotation of the rotating member 140.

Subsequently, the operation of the speed reducing gear 1 according to the present embodiment will be described. First, as the motor (not shown) is operated, the input shaft member 21 coupled to the motor rotates. As the input shaft member 21 rotates, the crankshaft 50 of the first change gear unit 31 coupled to the input shaft member 21 rotates about the input/output axis Lo. Thus, the first eccentric portion 51 and the second eccentric portion 52 that constitute the crankshaft 50 rotate.

Then, the first oscillating member 60 supported on the outer peripheral side of the first eccentric portion 51 oscillatingly rotates as the first eccentric portion 51 rotates. Similarly, the second oscillating member 70 supported on the outer peripheral side of the second eccentric portion 52 oscillatingly rotates as the second eccentric portion 52 rotates. At this time, only parts of the circumferences of the respective external gears 61 and 71 of the first oscillating member 60 and second oscillating member 70 are in mesh with the first internal gear 11 of the housing 10, and the first oscillating member 60 and the second oscillating member 70 rotate at a rotational speed based on the difference in the number of teeth from the first internal gear 11 in a direction opposite to the direction in which the input shaft member 21 rotates (that is, the counterclockwise direction when the input shaft member 21 rotates in the clockwise direction).

Here, each pin 41 of the rotating member 40 is inserted in a corresponding one of the insertion holes 62 of the first oscillating member 60 and a corresponding one of the insertion holes 72 of the second oscillating member 70. Then, only parts of the circumferences of the outer peripheral surfaces of the roller bearings 42 fitted around the pins 41 contact the inner peripheral surfaces of the insertion holes 62 and 72 to transmit driving force. Thus, as the first and second oscillating members 60 and 70 oscillatingly rotate, the axial rotation component is transmitted to the pins 41. Then, the rotating member 40 rotates at a rotational speed at which the first and second oscillating members 60 and 70 rotate on their axes. In this way, the rotating member 40 extracts the axial rotation component from the oscillating rotations of the first and second oscillating members 60 and 70 via the pins 41 and the roller bearings 42, and the first change gear unit 31 reduces the speed of rotation input into the crankshaft 50 and then outputs the rotation from the rotating member 40.

After that, as the rotating member 40 (crankshaft 150 of the second change gear unit 32) of the first change gear unit 31 rotates, the first eccentric portion 151 and the second eccentric portion 152 that constitute the crankshaft 150 of the second change gear unit 32 rotate. Then, the second change gear unit 32, as well as the first change gear unit 31, reduces the speed of rotation input into the crankshaft 150 and then outputs the rotation from the rotating member 140. Thus, the output shaft member 22 coupled to the rotating member 140 of the second change gear unit 32 rotates around the input/output axis Lo.

As described above, the speed reducing gear 1 according to the present embodiment uses the plurality of change gear units, that is, the first change gear unit 31 and the second change gear unit 32, to reduce the speed of rotation input into the input shaft member 21 in two stages and then output the rotation from the output shaft member 22. Setting the number of teeth of each of the gears in the thus configured speed reducing gear 1 will be described.

Where the number of teeth of the first internal gear 11 of the housing 10 is Z1 and the number of teeth of each of the external gears 61 and 71 of the first and second oscillating members 60 and 70 of the first change gear unit 31 is Z2, the speed reducing ratio R1 of the first change gear unit 31 is calculated by the mathematical expression 1). Similarly, where the number of teeth of the second internal gear 12 of the housing 10 is Z3 and the number of teeth of each of the external gears 161 and 171 of the first and second oscillating members 160 and 170 of the second change gear unit 32 is Z4, the speed reducing ratio R2 of the second change gear unit 32 is calculated by the mathematical expression 2). Then, the speed reducing ratio R of the speed reducing gear 1 is calculated by the mathematical expression 3).

$$R1=(Z1-Z2)/Z2 \qquad 1)$$

$$R2=(Z3-Z4)/Z4 \qquad 2)$$

$$R=R1 \times R2 \qquad 3)$$

There is a known fact that, as the transmission ratio of a speed change gear or the transmission ratio of a change gear unit increases, the transmission efficiency decreases, as shown in FIG. 4. The transmission ratio is calculated as the inverse number of the speed reducing ratio, and indicates the change gear ratio of the speed change gear. In addition, as the transmission efficiency decreases to a certain value or below, self-lock may occur in the speed change gear. Therefore, the transmission efficiency is desirably as high as possible.

For example, in a case where the transmission ratio of the speed reducing gear 1 is 169 (1/169 in the speed reducing ratio), when the number of teeth with which the above transmission ratio is obtained in a single-stage is set, the transmission efficiency is about 50%. Then, in the present embodiment, the number of teeth Z1 of the first internal gear 11 is set to 126, and the number of teeth Z2 of each of the external gears 61 and 71 of the first change gear unit 31 is set to 117. Then, the number of teeth Z3 of the second internal gear 12 is set to 224, and the number of teeth Z4 of each of the external gears 161 and 171 of the second change gear unit 32 is set to 208.

Thus, as shown in FIG. 5, the first and second change gear units 31 and 32 (n=1) each are able to obtain a transmission ratio of 13 and a transmission efficiency (speed reducing efficiency) of about 92%. Then, the speed reducing gear 1 (n=2) is able to obtain a transmission ratio of 169 (speed reducing ratio R is 1/169) and a transmission efficiency of about 85%. n in FIG. 5 indicates the number of change gear units. In this way, the numbers of teeth of the gears in the speed reducing gear 1 are set so as to be able to obtain a predetermined transmission ratio R in consideration of reduction in speed over multiple stages.

The speed reducing gear 1 to which the speed change gear according to the invention is applied includes the housing 10 and the first and second change gear units 31 and 32. The plurality of internal gears having different inside diameters, that is, the first and second internal gears 11 and 12, are formed on the inner peripheral surface of the housing 10. The rotating member 40 of the first change gear unit 31 and the crankshaft 150 of the second change gear unit 32 are integrally formed with each other. Thus, the rotating member 40 of the one side change gear unit (first change gear unit 31) and the first eccentric portion 151 and second eccentric portion 152 of the other side change gear unit (second change gear unit 32), which are next to each other, are coupled to each other.

Thus, a high change gear ratio may be obtained by the first and second change gear units 31 and 32 that are coupled to each other in tandem. Furthermore, the internal gears with which the external gears 61 and 71 of the first change gear unit 31 and the external gears 161 and 171 of the second change gear unit 32 are respectively in mesh are the first and second internal gears 11 and 12 that have different inside diameters and that are formed on the inner peripheral surface of the housing 10.

The speed change gear is required to have a mechanical strength corresponding to input driving force in order to deal with, for example, the input driving force or an increase in the driving force due to gear change. Therefore, in a case where the speed of rotation is reduced so as to generate high driving force, for example, the pitch circle diameter of each of the meshed internal gear and external gear may be increased to suppress pressure applied to tooth surfaces. However, when the plurality of speed reducing gears having different pitch circle diameters are coupled to each other in tandem as in the case of the related art, there is a possibility that the number of components of the speed reducing gear increases and the size of the speed reducing gear increases as a whole.

Therefore, with the above configuration, the first and second internal gears 11 and 12 have different inside diameters and are formed on the inner peripheral surface of the same housing 10, and the first and second change gear units 31 and 32 corresponding to the respective inside diameters are respectively arranged in correspondence with the first and second internal gears 11 and 12, so it is possible to obtain a mechanical strength corresponding to transmitted driving force. Thus, even when the first and second change gear units 31 and 32 are provided next to each other in order to obtain a high change gear ratio, it is possible to deal with driving force transmitted by the first and second change gear units 31 and 32. Furthermore, in comparison with the case where the existing speed reducing gears having the same configuration are coupled to each other in tandem, it is possible to reduce the number of components of the speed reducing gear 1 and to simplify the speed reducing gear 1. Thus, in a driving state where the speed reducing gear 1 is transmitting driving force, a mechanical loss due to transmission of driving force is reduced to make it possible to improve the transmission efficiency.

In addition, the first and second change gear units 31 and 32 are respectively arranged at locations, at which the first and second internal gears 11 and 12 are formed, in the direction along the input/output axis Lo inside the housing 10. Thus, in comparison with the configuration where a plurality of speed reducing gears are coupled to each other, it is possible to easily obtain a high change gear ratio. Then, in this case, because first and second change gear units 31 and 32 are directly coupled to each other, the size of the speed reducing gear 1 may be reduced as a whole. Here, there is a generally known fact that the transmission efficiency reduces if a high change gear ratio is attempted to be obtained. Then, the first and second change gear units 31 and 32 are set so as to obtain a predetermined change gear ratio to thereby make it possible to maintain a high transmission efficiency in the first and second change gear units 31 and 32. Therefore, it is possible to improve the transmission efficiency even with the same change gear ratio as that in the related art.

In addition, the first change gear unit 31 includes the first and second eccentric portions 51 and 52 that are provided next to each other in the direction along the input/output axis Lo and the first and second oscillating members 60 and 70 that are respectively supported by the first and second eccentric portions 51 and 52. Thus, the load on the external gears 61 and 71 of the first and second oscillating members 60 and 70 in the first change gear unit 31 may be dispersed. Thus, with the first change gear unit 31, it is possible to increase the mechanically transmittable maximum driving force. In addition, a similar advantageous effect may be obtained in the second change gear unit 32 that includes the first and second eccentric portions 151 and 152 and the first and second oscillating members 160 and 170.

Furthermore, the first eccentric portion 51 and the second eccentric portion 52 in the first change gear unit 31 are coupled to the input shaft member 21 via the crankshaft 50 such that the first and second oscillating members 60 and 70 that are supported by the first and second eccentric portions 51 and 52 are arranged at equiangular positions in the circumferential direction of rotation about the input/output axis Lo. That is, the first eccentric portion 51 and the second eccentric portion 52 are coupled to each other in the direction along the input/output axis Lo such that the first and second oscillating members 60 and 70 are arranged at an interval of 180 degrees. Thus, it is possible to cancel an imbalance of rotation caused by the rotation of the first eccentric portion 51 and second eccentric portion 52.

In addition, the first eccentric portion 151 and second eccentric portion 152 of the second change gear unit 32 are coupled to the input shaft member 21 via the crankshaft 150 and the first change gear unit 31 such that the first and second oscillating members 160 and 170 are arranged in a manner similar to that described above. Therefore, a similar advantageous effect may be obtained. Thus, with the above configuration, it is possible to suppress vibrations in the first and second change gear units 31 and 32 and the speed reducing gear 1.

The rotating member 40 of the first change gear unit 31 is integrally formed with the crankshaft 150 of the second change gear unit 32. That is, the first and second eccentric portions 151 and 152 of the second change gear unit 32 are integrally coupled to the rotating member 40 at locations that are eccentric in the radial direction. Thus, the first and second oscillating members 160 and 170 of the second change gear unit 32 are rotatably supported on the outer peripheral surface of the rotating member 40 of the first change gear unit 31. With the above configuration, the rotating member 40 of the first change gear unit 31 has the functions as the first and second eccentric portions 151 and 152 of the second change gear unit 32, and is formed as a single member. Thus, the number of components may be reduced. Furthermore, in comparison with the case where the first and second change gear units 31 and 32 are simply coupled to each other in the direction along the input/output axis Lo, the axial length of the speed reducing gear 1 along the input/output axis Lo may be reduced. Therefore, the size of the speed reducing gear 1 may be reduced as a whole.

The speed reducing gear 1 includes the first pin support member 81 that supports the pins 41 inserted through the insertion holes 62 and 72 of the first and second oscillating members 60 and 70 of the first change gear unit 31. Similarly, the speed reducing gear 1 includes the second pin support member 82 that supports the pins 141 inserted through the insertion holes 162 and 172 of the first and second oscillating members 160 and 170 of the second change gear unit 32. With the above configuration, both end portions of each of the pins 41 of the rotating member 40 of the first change gear unit 31 are supported respectively by the rotating member 40 and the first pin support member 81, and both end portions of each of the pins 141 of the rotating member 140 of the second change gear unit 32 are respectively supported by the rotating member 140 and the second pin support member 82.

The pins 41 of the rotating member 40 output the axial rotation component of the oscillatingly rotating first and second oscillating members 60 and 70, and the pins 141 of the rotating member 140 output the axial rotation component of the oscillatingly rotating first and second oscillating members 160 and 170. Therefore, as the rotational speed of the first and second eccentric portions 51 and 52 increases in a state where the speed reducing gear 1 is driven, the rotating member 40 may be influenced by the oscillating rotations of the first and second oscillating members 60 and 70 to wobble accordingly, or as the rotational speed of the first and second eccentric portions 151 and 152 increases in a state where the speed reducing gear 1 is driven, the rotating member 140 may be influenced by the oscillating rotations of the first and second oscillating members 160 and 170 to wobble accordingly. Then, the pins 41 and 141 of the respective rotating members 40 and 140 are supported at both ends using the first and second pin support members 81 and 82. This configuration prevents the wobbling of the rotating members 40 and 140, and the like, and may be applied to transmission of driving force at a high rotational speed.

In the present embodiment, the first and second pin support members 81 and 82 are provided. Supporting the pins 41 of the first change gear unit 31, which rotates at a particularly high speed in a state where the speed reducing gear 1 is driven, at both ends using, for example, the above first pin support member 81 is useful. The number of teeth Z1 of the first internal gear 11 is larger than the number of teeth Z2 of each of the external gears 61 and 71. Thus, the input shaft member 21 that is coupled to the first and second eccentric portions 51 and 52-side of the first change gear unit 31 rotates at a speed higher than that of the output shaft member 22 that is coupled via the second change gear unit 32 to the rotating member 40-side.

Then, in the speed reducing gear 1 to which the speed change gear according to the invention is applied, in a state where the speed reducing gear 1 is driven, the first change gear unit 31 that is located at the input shaft member 21-side rotates at a speed higher than that of the second change gear unit 32. As described above, there is a possibility that the rotating member 40 wobbles due to the influence of oscillating rotations of the first and second oscillating members 60 and 70 caused by an increase in the rotational speed of the first and second eccentric portions 51 and 52. Then, at least the pins 41 of the high rotational speed-side rotating member 40 within the first and second change gear units 31 and 32 are supported by the first pin support member 81. This configuration prevents the wobbling of the rotating member 40, and the like, and may be applied to transmission of driving force at a higher rotational speed.

In addition, the first pin support member 81 supports the pins 41 at both ends in cooperation with the rotating member 40, and supports the plurality of pins 41 so as to maintain the intervals between the pins 41. Similarly, the second pin support member 82 supports the pins 141 at both ends in cooperation with the rotating member 140, and supports the plurality of pins 141 so as to maintain the intervals between the pins 141. Thus, even when driving force transmitted in a state where the speed reducing gear 1 is driven is exerted on the plurality of pins 41 or the plurality of pins 141, the intervals between the pins 41 or the pins 141 are maintained. Therefore, it is possible to prevent driving force exerted on the plurality of pins 41 or 141 from being concentrated on a certain pin 41 or 141. Thus, it is possible to stabilize the drive state of the speed reducing gear 1.

Figure 6:
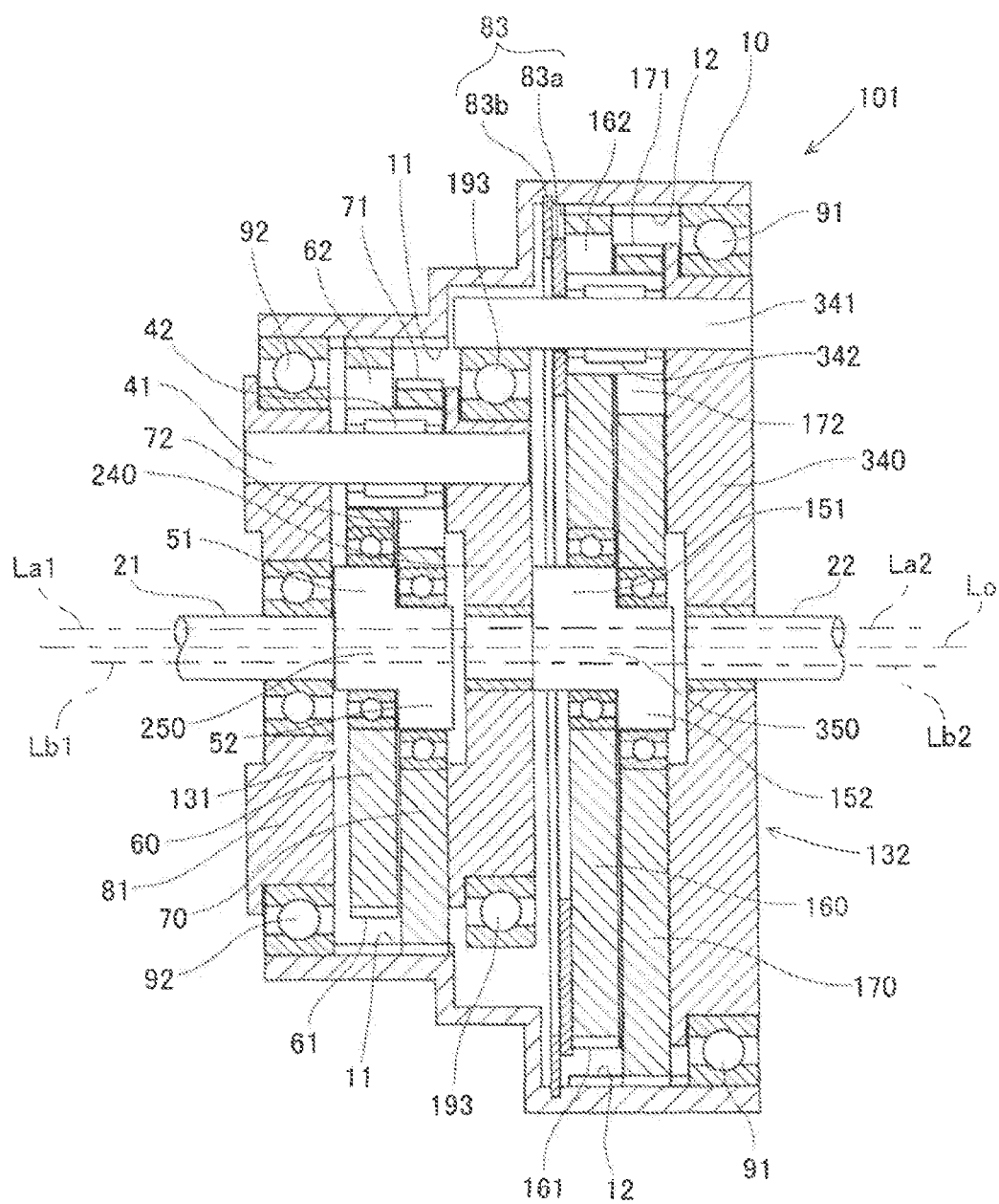
FIG. 6 is a sectional view that shows the configuration of a speed reducing gear according to a second embodiment.
Figure 7:
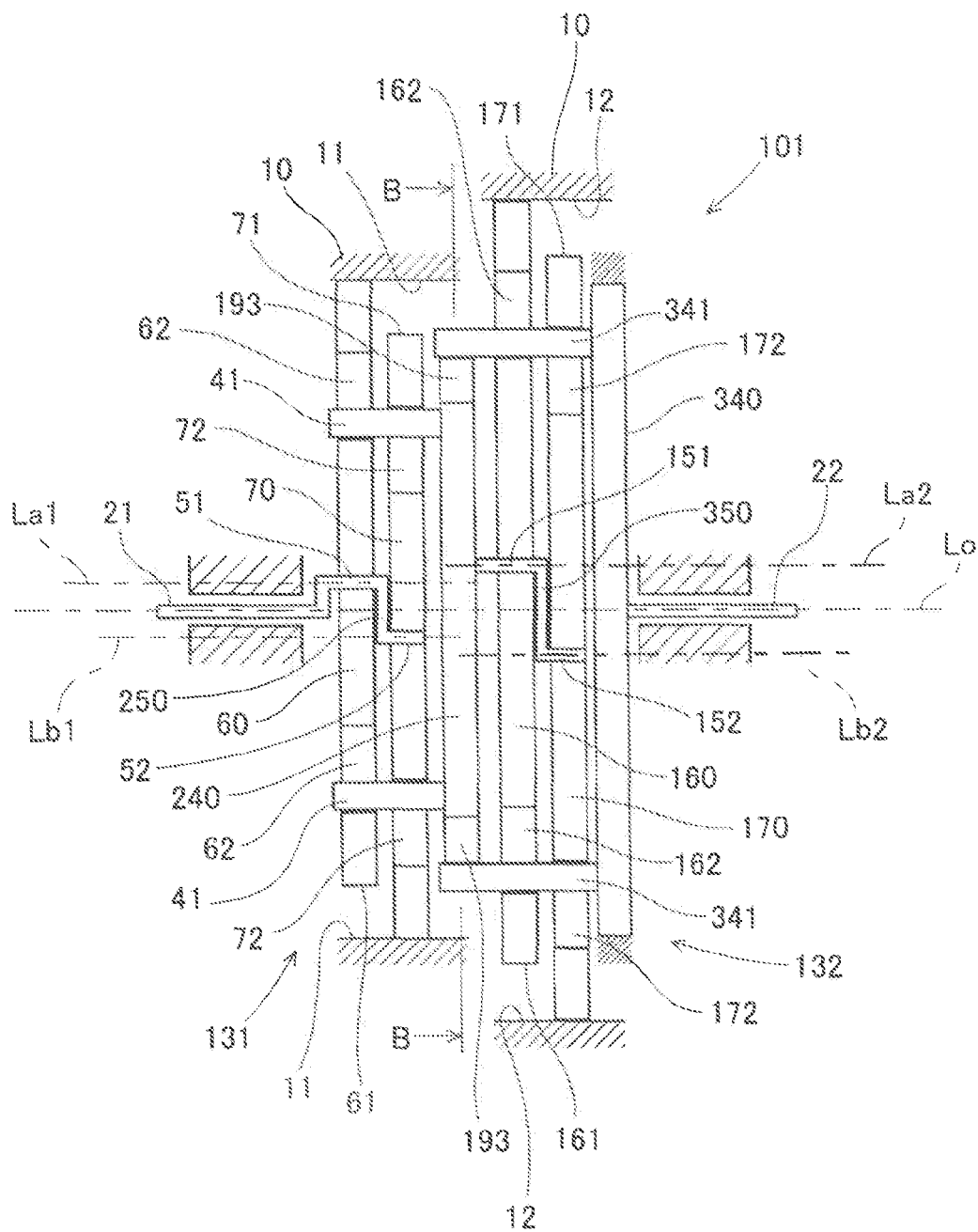
FIG. 7 is a conceptual view that shows the basic configuration of the speed reducing gear according to the second embodiment.
Figure 8:
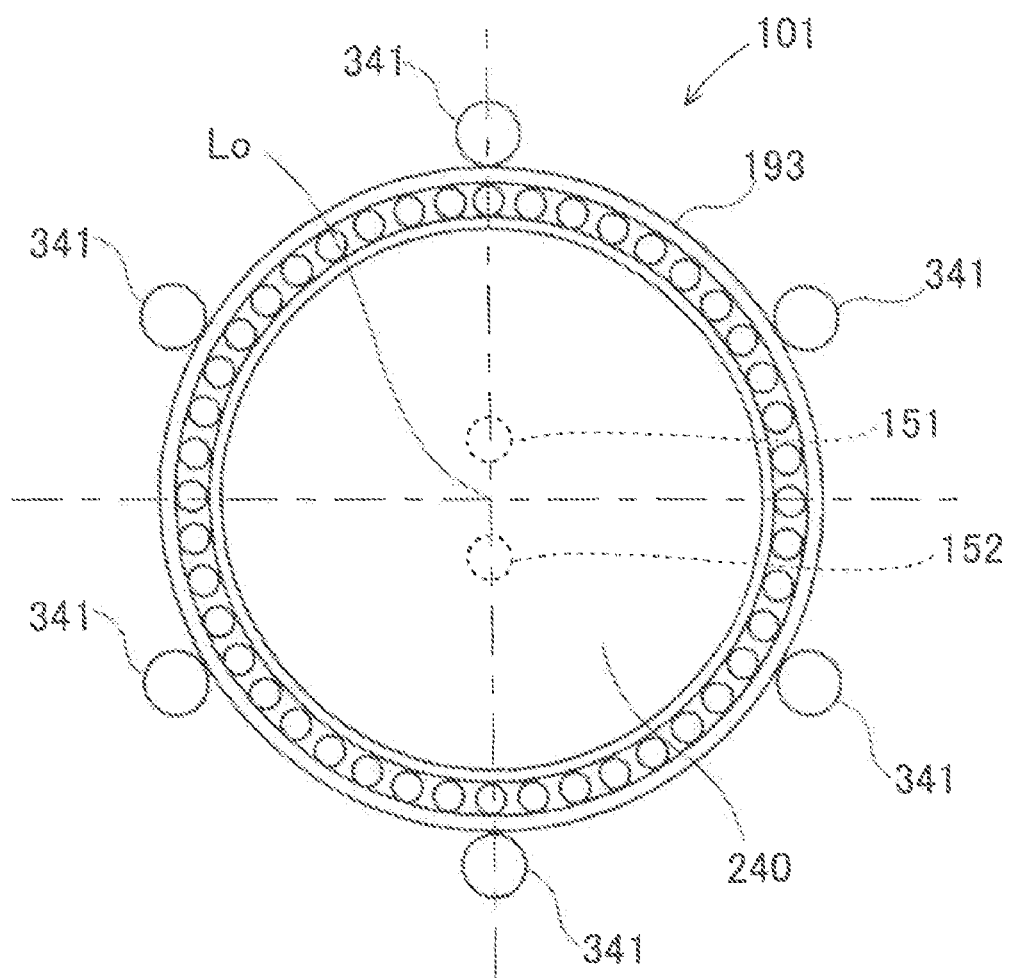
FIG. 8 is a sectional view that is taken along the line B-B in FIG. 7.

The configuration of the second embodiment will be described with reference to FIG. 6 to FIG. 8. FIG. 6 is a sectional view that shows the configuration of a speed reducing gear 101. FIG. 7 is a conceptual view that shows the basic configuration of the speed reducing gear 101. FIG. 8 is a sectional view taken along the line B-B in FIG. 7. The second embodiment mainly differs from the first embodiment in the configuration of the first and second change gear units 31 and 32. Note that, in the sectional view of FIG. 6, some parts of the configuration of the speed reducing gear 101, for example, pins 41, 341 located on the lower side of FIG. 6 are omitted. In addition, the other configuration is the same as that of the first embodiment. Therefore, the detailed description thereof is omitted. Hereinafter, only the difference will be described.

The speed reducing gear 101 is mainly formed of a housing 10, an input shaft member 21, an output shaft member 22, a first change gear unit 131, a second change gear unit 132, a first pin support member 81, a pin retaining member 83 and bearings 91, 92 and 193. As shown in FIG. 6 and FIG. 7, the first change gear unit 131 is a unit that is formed of a rotating member 240, a crankshaft 250, a first oscillating member 60 and a second oscillating member 70. Similarly, the second change gear unit 132 is a unit that is formed of a rotating member 340, a crankshaft 350, a first oscillating member 160 and a second oscillating member 170.

In the first embodiment, the rotating member 40 of the first change gear unit 31 and the crankshaft 150 of the second change gear unit 32 are integrally formed with each other. In contrast to this, the first and second change gear units 131 and 132 according to the present embodiment are configured such that the respective members (the rotating member 240 and the crankshaft 350) are arranged in the direction along the input/output axis Lo and are coupled to each other. Thus, the second embodiment differs from the first embodiment in that the rotating member 240 of the first change gear unit 131 is coupled to the output shaft member 22 via the second change gear unit 132.

In addition, in the first embodiment, the rotating member 40 of the first change gear unit 31 is rotatably supported when the projecting portion 153 of the rotating member 40 is inserted in the recessed portion 143 of the rotating member 140 of the second change gear unit 32. In contrast to this, the rotating member 240 of the first change gear unit 131 according to the present embodiment differs from the rotating member 40 of the first embodiment in that the outer peripheral surface of the rotating member 240 is supported by the pins 341 of the rotating member 340 of the second change gear unit 132.

Furthermore, in the first embodiment, the pins 141 of the second change gear unit 32 each are supported at both ends by the rotating member 140 and the second pin support member 82. In contrast to this, the pins 341 of the second change gear unit 131 according to the present embodiment differ from the pins 141 according to the first embodiment in that the input-side end portions are retained by the pin retaining member 83.

The rotating member 240 of the first change gear unit 131 has the pins 41 and the roller bearings 42, and a bearing 193 is fitted around the outer peripheral surface of the rotating member 240 as shown in FIG. 8. The outer peripheral surface of the bearing 193 is in contact with the pins 341 of the rotating member 340 of the second change gear unit 132. Thus, the rotating member 240 is rotatably supported by the pins 341 via the bearing 193. The crankshaft 250 of the first change gear unit 131 has a first eccentric portion 51 and a second eccentric portion 52. The input-side end portion of the crankshaft 250 is coupled to the input shaft member 21.

The rotating member 340 of the second change gear unit 132 has the pins 341 and roller bearings 342. The pins 341 are formed so as to protrude from one side disc surface of the rotating member 340 in the direction along the input/output axis Lo. As shown in FIG. 8, the six pins 341 are fixed to the disc surface so as to be arranged at equiangular positions in the circumferential direction of rotation about the input/output axis Lo.

Each of the pins 341 is a columnar member that is fixed to the rotating member 340. Each of the roller bearings 342 is a cylindrical member that is rotatably fitted around a corresponding one of the pins 341. Each pin 341 is inserted through insertion holes 162 and 172 of the first and second oscillating members 160 and 170. Part of each roller bearing 342 fitted around a corresponding one of the pins 341 is in contact with the inner peripheral surfaces of these insertion holes 162 and 172. In addition, each pin 341 is inserted through the insertion holes 162 and 172 and is in contact with the outer peripheral surface of the bearing 193 to thereby rotatably support the rotating member 240 of the first change gear unit 131 via the bearing 193.

The crankshaft 350 of the second change gear unit 132 has a first eccentric portion 151 and a second eccentric portion 152. The input-side end portion of the crankshaft 350 is coupled to the rotating member 240 of the first change gear unit 131. Thus, the crankshaft 350 of the second change gear unit 132 is coupled to the input shaft member 21 via the first change gear unit 131. In addition, as in the case of the first embodiment, the crankshaft 350 may have a projecting portion 153 at its output-side end portion and may be supported by the rotating member 340.

The pin retaining member 83 includes a plate 83a and a retaining ring 83b. The pin retaining member 83 is arranged on a side toward which the pins 341 of the rotating member 340 protrude with respect to the first and second eccentric portions 151 and 152 of the second change gear unit 132.

The plate 83a is an annular member that has a diameter smaller than that of the tooth tip cylinder of the second internal gear 12 of the housing 10. The plate 83a has a cylindrical inner surface that centers on the input/output axis Lo so as not to contact the eccentric member (first eccentric portion 151) that eccentrically rotates. Then, the plate 83a has pin holes that are equal in number to the plurality of pins 341. The end portions of the pins 341 that are inserted through the insertion holes 162 and 172 of the first and second oscillating members 160 and 170 are loosely fitted in the pin holes. Thus, the plate 83a retains the six pins 341 fixed to the rotating member 340 such that the intervals between the pins 341 are maintained. The plate 83a rotates at the same rotational speed as the rotating member 340 with the rotation of the rotating member 340.

The retaining ring 83b is an annular member that has a diameter substantially equal to or larger than that of a cylindrical retaining ring groove formed on the inner peripheral surface of the housing 10. The retaining ring 83b is inserted into the inside of the housing 10 with its diameter being reduced, and then the diameter of the retaining ring 83b is increased at a predetermined location in the direction along the input/output axis Lo, at which the retaining ring groove is formed, thus being fitted into the retaining ring groove. Thus, the retaining ring 83b is fixed to the inner peripheral surface of the housing 10, the retaining ring 83b is in slide contact with the plate 83a that rotates in a state where the speed reducing gear 101 is driven, and the retaining ring 83b positions the plate 83a that retains the pins 341 at the predetermined location in the direction along the input/output axis Lo.

With the above configuration, the intervals between the plurality of pins 341 of the rotating member 340 are maintained by the plate 83a even when driving force transmitted in a state where the speed reducing gear 101 is driven is exerted on the pins 341. This prevents driving force exerted on the plurality of pins 341 from being concentrated on a certain pin 341 to thereby make it possible to stabilize the drive state of the speed reducing gear 101. Because the other configurations of the speed reducing gear 101 are substantially the same as the corresponding configurations of the speed reducing gear 1 according to the first embodiment, the detailed description thereof is omitted.

With the thus configured speed reducing gear 101, similar advantageous effects to those of the speed reducing gear 1 according to the first embodiment are obtained. In addition, the outer peripheral surface of the rotating member 240 of the first change gear unit 131 is supported by the pins 341 of the rotating member 340 of the second change gear unit 132. With the above configuration, the rotating member 240 of the first change gear unit 131 is indirectly supported by the housing 10 via the second change gear unit 132 without requiring, for example, a support member that is arranged on the outer peripheral side of the rotating member 240. Thus, the above-described support member is not required. Therefore, the number of components may be reduced.

Figure 9:
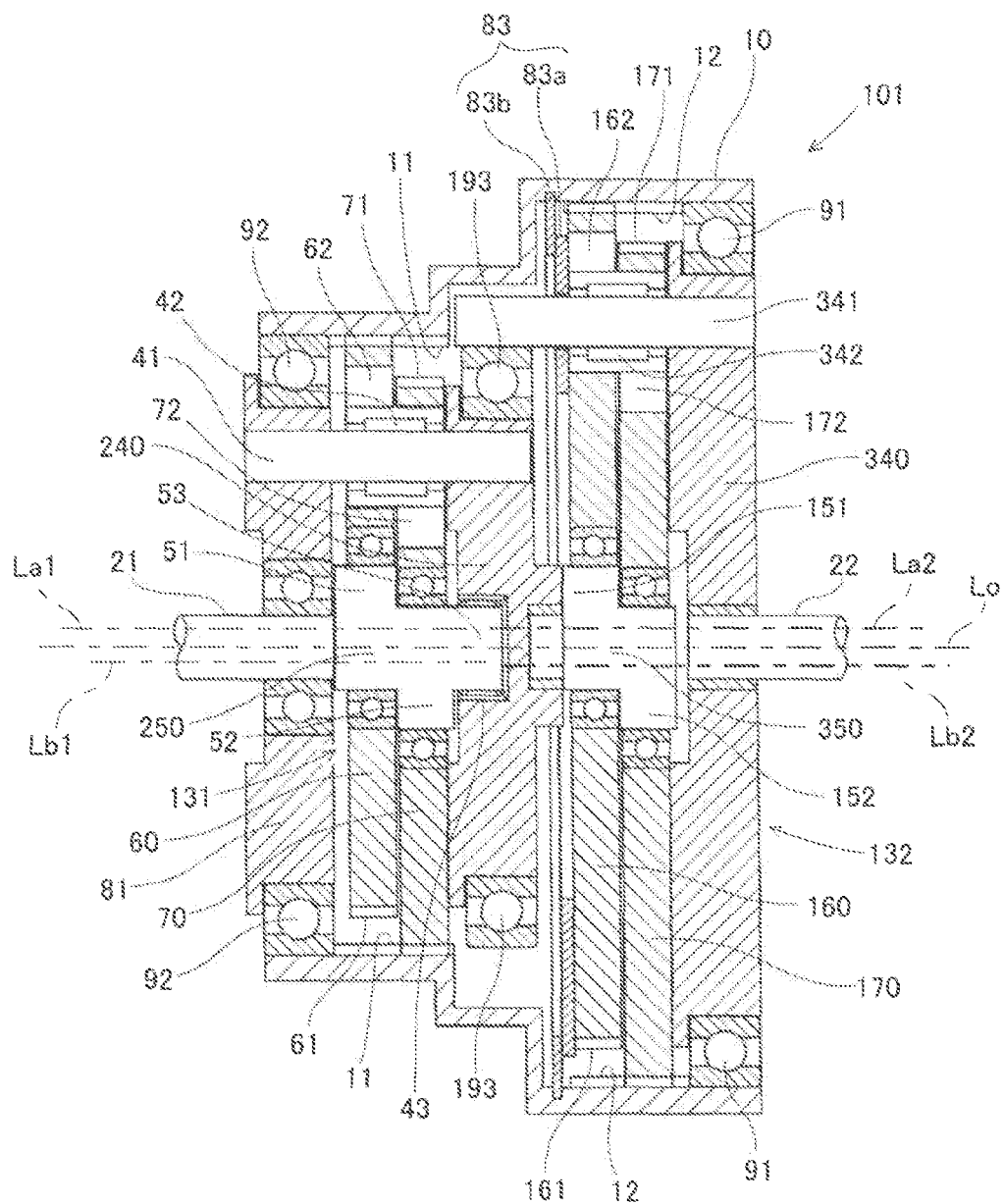
FIG. 9 is a sectional view that shows the configuration of a modified example of the second embodiment.

A modified example of the second embodiment will be described with reference to FIG. 9. FIG. 9 is a sectional view that shows the configuration of the speed reducing gear 101. Note that, in the sectional view of FIG. 9, parts of the configuration of the speed reducing gear 101, for example, pins 41, 341, located at the lower side of FIG. 9 are omitted.

In the second embodiment shown in FIG. 6, the rotating member 240 is supported by the pins 341 of the rotating member 340 of the second change gear unit 132 via the bearing 193. In contrast to this, as in the case of the present modified example, the rotating member 240 may be supported by the crankshaft 250 and supports the pins 341 of the second change gear unit 132 at both ends in cooperation with the rotating member 340.

In the present modified example, as in the case of the first embodiment, the rotating member 240 has a recessed portion 43 having a cylindrical inner surface, as shown in FIG. 9. The crankshaft 250 has a projecting portion 53 at its output-side end portion. The projecting portion 53 is inserted in the recessed portion 43 formed in the rotating member 240. That is, the crankshaft 250 supports the rotating member 240 via a bearing such that the rotating member 240 is rotatable about the input/output axis Lo. Thus, the rotating member 240 supports the pins 341 of the rotating member 340 of the second change gear unit 132 via the bearing 193.

That is, both end portions of each pin 341 of the second change gear unit 132 are supported by the rotating member 240 of the first change gear unit 131 and the rotating member 340 of the second change gear unit 132. The pins 341 of the rotating member 340 of the second change gear unit 132 are inserted through the insertion holes 162 and 172 of the first and second oscillating members 160 and 170, and output the axial rotation component of the oscillatingly rotating first and second oscillating members 160 and 170. Therefore, as the rotational speed of the first and second eccentric portions 151 and 152 increases in a state where the speed reducing gear 101 is driven, the rotating member 340 may be influenced by the oscillating rotations of the first and second oscillating members 160 and 170 to wobble accordingly. Then, with the above configuration, the pins 341 of the rotating member 340 are supported at both ends. This configuration prevents the wobbling of the rotating member 340, and the like, and may be applied to transmission of driving force at a high rotational speed.

Figure 10:
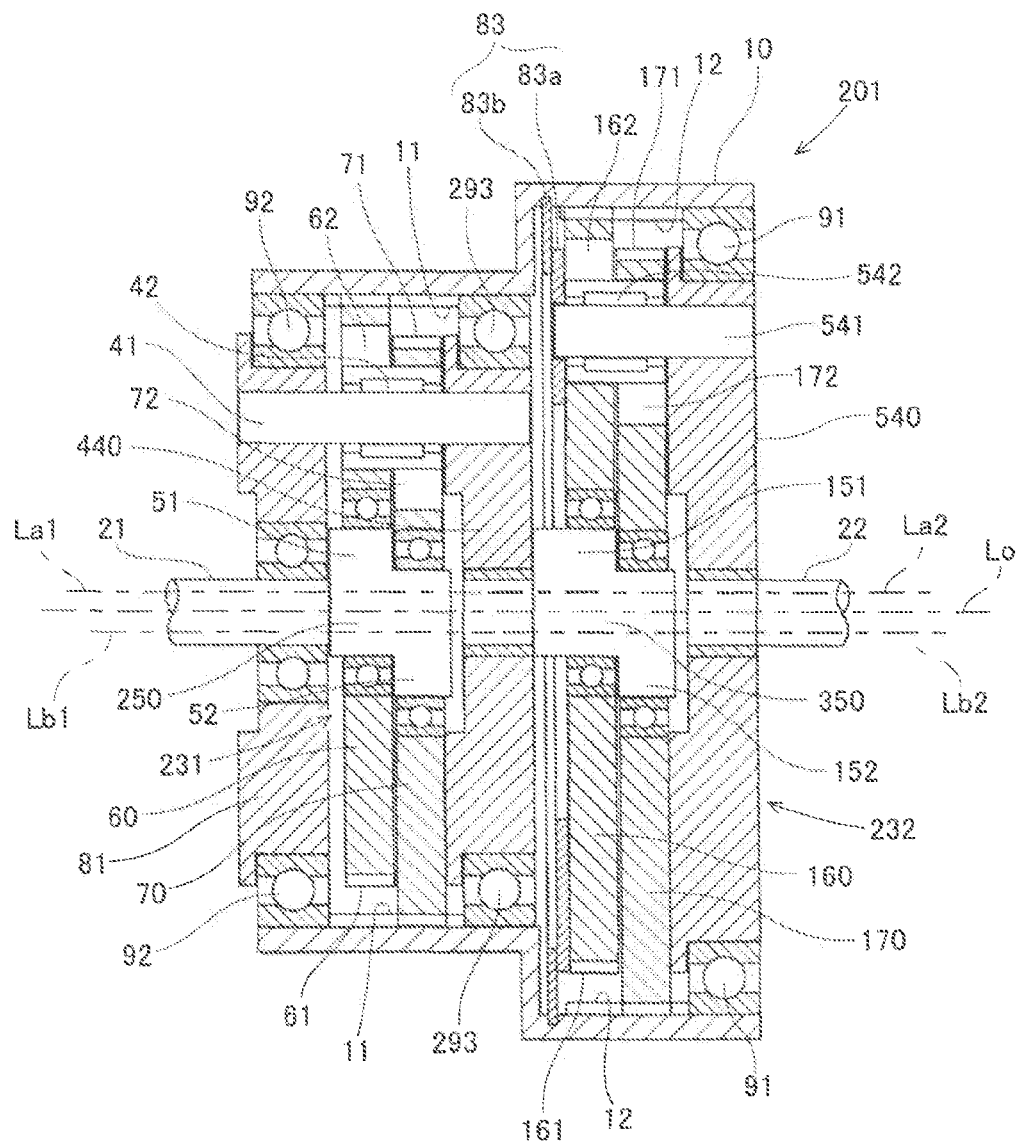
FIG. 10 is a sectional view that shows the configuration of a speed reducing gear according to a third embodiment.
Figure 11:
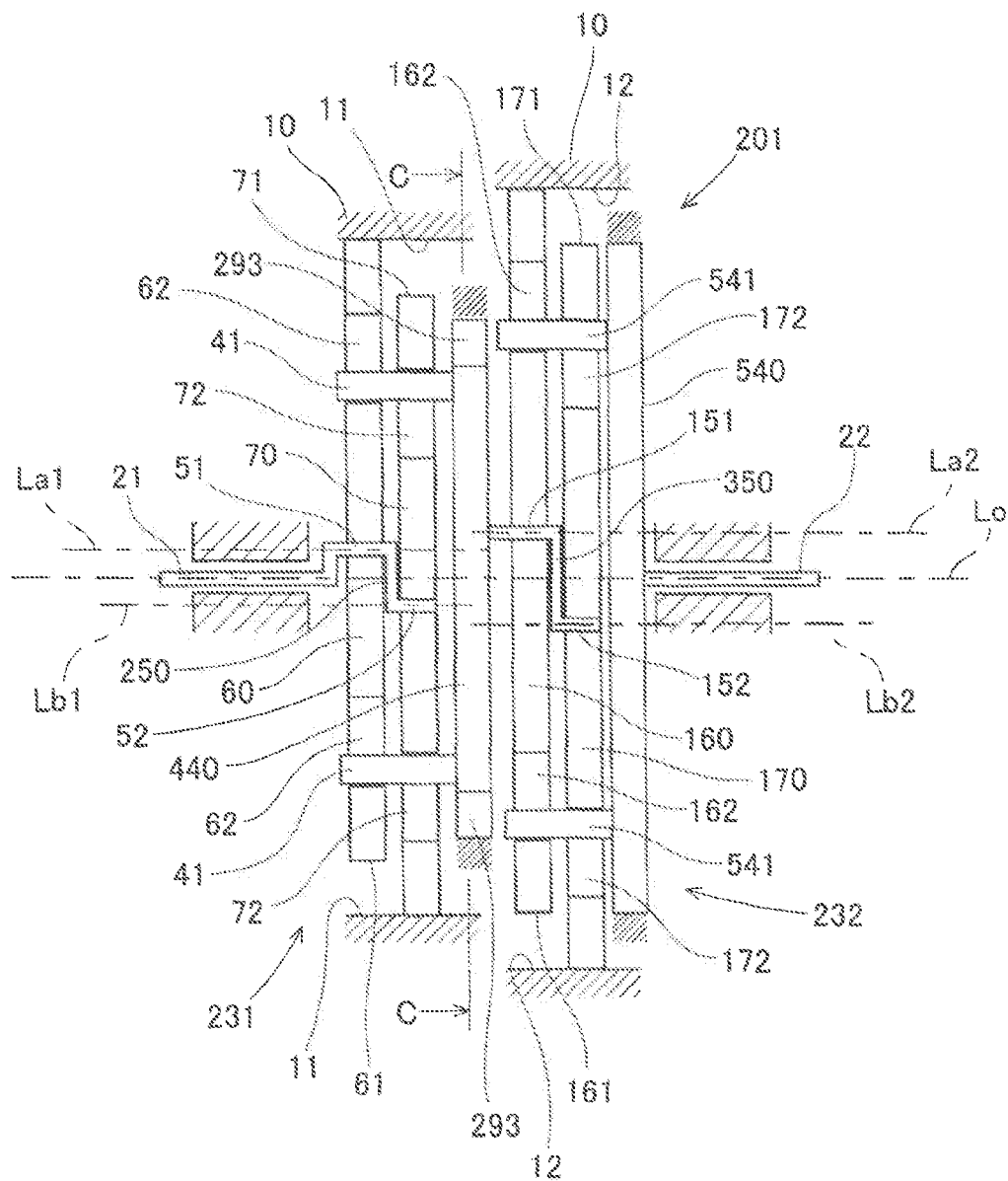
FIG. 11 is a conceptual view that shows the basic configuration of the speed reducing gear according to the third embodiment.
Figure 12:
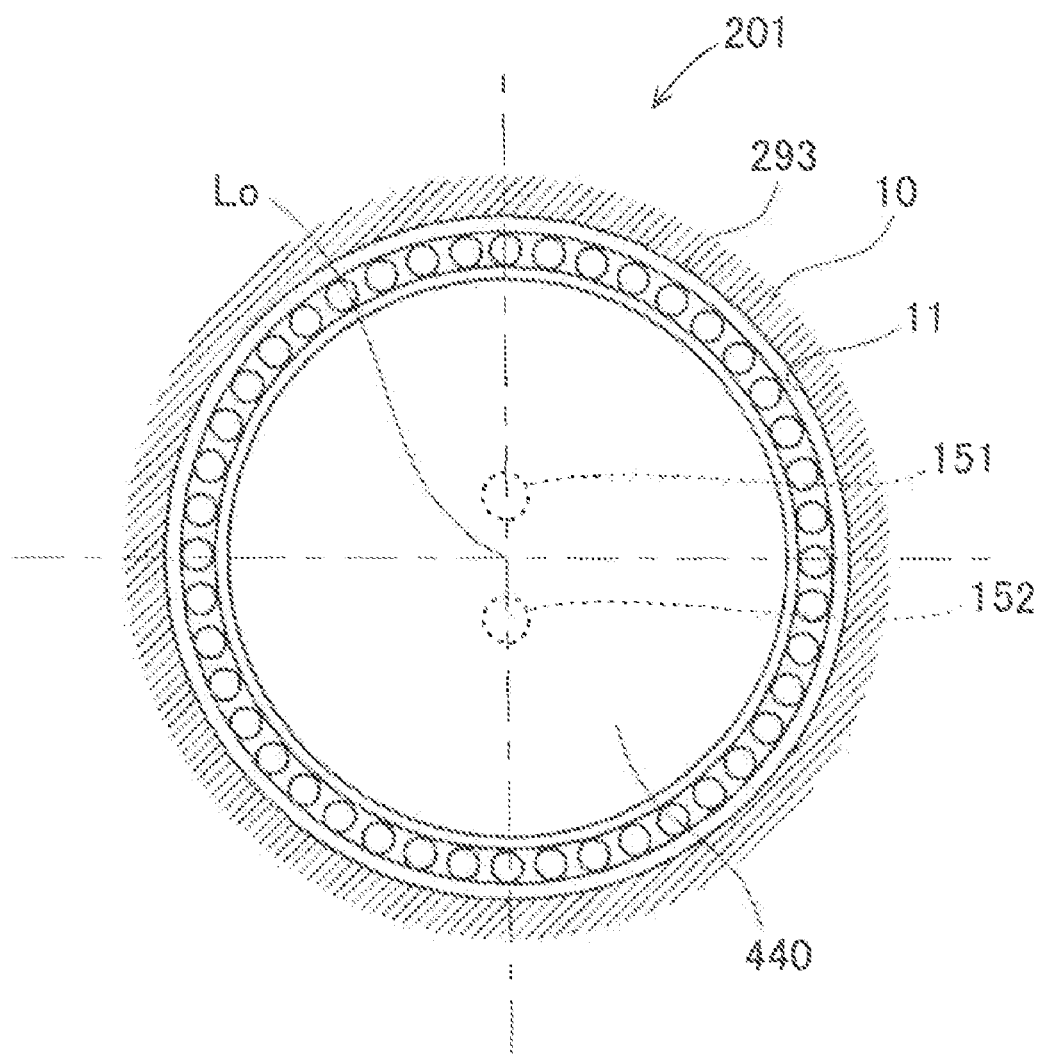
FIG. 12 is a sectional view that is taken along the line C-C in FIG. 11.

The configuration of a third embodiment will be described with reference to FIG. 10 to FIG. 12. FIG. 10 is a sectional view that shows the configuration of a speed reducing gear 201. FIG. 11 is a conceptual view that shows the basic configuration of the speed reducing gear 201. FIG. 12 is a sectional view taken along the line C-C in FIG. 11. The configuration according to the third embodiment mainly differs from that of the second embodiment in the configuration of the first and second change gear units 131 and 132. Note that, in the sectional view of FIG. 10, parts of the configuration of the speed reducing gear 201, for example, pins 41, 541 located at the lower side of FIG. 10 are omitted. In addition, because the other configuration is the same as that of the second embodiment, the detailed description thereof is omitted. Hereinafter, only the difference will be described.

The speed reducing gear 201 is mainly formed of a housing 10, an input shaft member 21, an output shaft member 22, a first change gear unit 231, a second change gear unit 232, a first pin support member 81, a pin retaining member 83 and bearings 91, 92 and 293. As shown in FIG. 10 and FIG. 11, the first change gear unit 231 is a unit that is formed of a rotating member 440, a crankshaft 250, a first oscillating member 60 and a second oscillating member 70. Similarly, the second change gear unit 232 is a unit that is formed of a rotating member 540, a crankshaft 350, a first oscillating member 160 and a second oscillating member 170.

In the second embodiment, the outer peripheral surface of the rotating member 240 of the first change gear unit 131 is supported by the pins 341 of the rotating member 340 of the second change gear unit 132. In contrast to this, the present embodiment differs from the second embodiment in that the rotating member 440 of the first change gear unit 231 is supported by the housing 10 via the bearing 293.

The rotating member 440 of the first change gear unit 131 has the pins 41 and roller bearings 42, and the outer peripheral surface of the rotating member 440 is supported by the bearing 293 as shown in FIG. 12. The bearing 293 is fixed to a cylindrical surface formed on the inner peripheral surface of the housing 10. The inner peripheral surface of the bearing 293 supports the rotating member 440. Thus, the rotating member 440 is rotatably supported by the housing 10 via the bearing 293.

The rotating member 540 of the second change gear unit 132 has the pins 541 and roller bearings 542. The pins 541 are formed so as to protrude from one side disc surface of the rotating member 540 in the direction along the input/output axis Lo. As shown in FIG. 12, the six pins 541 are fixed to the disc surface so as to be arranged at equiangular positions in the circumferential direction of rotation about the input/output axis Lo.

Each of the pins 541 is a columnar member that is fixed to the rotating member 540. Each of the roller bearings 542 is a cylindrical member that is rotatably fitted around a corresponding one of the pins 541. Each pin 541 is inserted through insertion holes 162 and 172 of the first and second oscillating members 160 and 170. Part of each roller bearing 542 fitted around a corresponding one of the pins 541 is in contact with the inner peripheral surfaces of these insertion holes 162 and 172. In addition, each pin 541 is inserted through the insertion holes 162 and 172, and has such a length that the pin 541 does not contact the bearing 293 fixed to the housing 10. The other configurations of the speed reducing gear 201 are substantially the same as the corresponding configurations of the speed reducing gear 101 according to the second embodiment. Therefore, the detailed description thereof is omitted.

With the thus configured speed reducing gear 201, advantageous effects similar to those of the speed reducing gear 101 according to the second embodiment are obtained. In addition, the outer peripheral surface of the rotating member 440 of the first change gear unit 231 is supported by the bearing 293. With the above configuration, the rotating member 440 of the first change gear unit 231 is more reliably supported by the housing 10 via the bearing 293. Thus, this configuration is particularly useful in the case where there is a possibility that the rotating member 440 wobbles, for example, in the case where the rotating member 440 of the first change gear unit 231 rotates at a high rotational speed in a state where the speed reducing gear 201 is driven.

In the first to third embodiments, the speed reducing gear 1, 101 or 201 includes two change gear units, that is, the first change gear unit 31, 131 or 231 and the second change gear unit 32, 132 or 232. In contrast to this, the speed reducing gear 1, 101 or 201 may include three or more change gear units. In such a case, an internal gear corresponding to an additional change gear unit is formed on the inner peripheral surface of the housing 10 in addition to the first and second internal gears 11 and 12.

With the above configuration, each of the change gear units may obtain a mechanical strength corresponding to a transmitted driving force. Thus, even in the case where the first and second change gear units 31 and 32 are provided next to each other in order to obtain a high change gear ratio, it is possible to reduce the number of components of the speed reducing gear 1 and to simplify the speed reducing gear 1 in comparison with the case where the existing speed reducing gears having the same configuration are coupled in tandem with each other. Thus, in a drive state where the speed reducing gear 1 is transmitting driving force, a mechanical loss due to transmission is reduced to make it possible to improve the transmission efficiency.

In addition, in the first to third embodiments, the first change gear unit 31, 131 or 231 and second change gear unit 32, 132 or 232 of the speed reducing gear 1, 101 or 201 respectively includes the first and second oscillating members 60 and 70, and 160 and 170. In contrast to this, each of the first change gear unit and the second change gear unit may include a single oscillating member. In such a case, the crankshaft 50, 150, 250 or 350 has a single eccentric portion. With the above configuration, the length of each change gear unit in the direction along the input/output axis Lo may be reduced. Thus, the speed reducing gear 1, 101 or 201 is able to obtain a high change gear ratio using the plurality of change gear units, and may be reduced in size as a whole.

In addition, whether each change gear unit includes a single oscillating member or multiple oscillating members may be selectively set on the basis of a driving force transmitted by the change gear unit, a change gear ratio, a rotational speed, or the like, in a state where the speed change gear is driven. For example, when the transmitted driving force is large, it is desirable that each change gear unit should have multiple oscillating members in terms of reducing a load on each external gear. Among a plurality of change gear units of the speed change gear, only the change gear unit with lower rotational speed (higher torque) in a state where the speed change gear is driven may include a plurality of oscillating members. Other than the above, in terms of canceling an imbalance due to rotation of eccentric members and oscillating members, among the plurality of change gear units, only the change gear unit with higher rotational speed (lower torque) in a state where the speed change gear is driven may include a plurality of oscillating members.

For example, in the speed reducing gear 1 according to the first embodiment, the rotating member 40 has the pins 41, and the first and second oscillating members 60 and 70 respectively have the insertion holes 62 and 72 through which the pins 41 are inserted. In contrast to this, as described above, when each change gear unit has a single oscillating member, members in which the pins and the insertion holes are respectively arranged may be interchanged. That is, the first oscillating member 60 has pins, and the rotating member 40 has insertion holes through which the pins are inserted.

With the above configuration as well, only the axial rotation component of the oscillatingly rotating first oscillating member 60 may be received from or output to the rotating member 40. However, in the case of the above configuration, the insertion holes are formed so as to ensure the oscillation width of each pin that oscillatingly rotates with the first oscillating member 60. Therefore, the rotating member 40 that has the insertion holes tends to increase in diameter. Thus, when the size of the speed change gear is reduced or when the speed change gear includes a plurality of oscillating members in order to increase transmittable maximum driving force, the configurations illustrated in the first to third embodiments are desirably employed.

The speed reducing gear 1, 101 or 201 has been described as the speed change gear according to the invention. Other than the above, a speed increasing gear that employs the speed change gear according to the invention may be configured by inverting the input/output relationship between the input shaft member 21 and the output shaft member 22. Particularly, in the speed increasing gear, as shown in FIG. 4, there is a known fact that the transmission efficiency decreases as the transmission ratio increases. The transmission ratio in the speed increasing gear is equal to the speed increasing ratio, and indicates the change gear ratio of the speed change gear. Then, the transmission efficiency in the speed increasing gear further decreases as the transmission ratio increases in comparison with the speed reducing gear. Therefore, it is required to maintain high transmission efficiency in order to obtain a high change gear ratio.

If the speed change gear according to the aspect of the invention is applied to the speed increasing gear, it is possible to obtain a high speed increasing efficiency with respect to a predetermined speed increasing ratio in comparison with the related art. Specifically, for example, if the numbers of teeth of the internal gear 11 and external gears 61, 71, 161 and 172 are set such that the transmission ratio of each change gear unit is 13, it is possible to obtain a transmission ratio of 169 (speed increasing ratio is 169) and a transmission efficiency of about 83% as shown in FIG. 5 in a case where the speed increasing gear includes two change gear units (n=2). Similarly, when the number of change gear units is 3 or 4, it is possible to obtain a high speed increasing efficiency with respect to a transmission ratio as shown in FIG. 5.

What is claimed is:

1. A speed change gear comprising:
   a housing that supports an input shaft and an output shaft rotatably about a common input/output axis, and that has a plurality of internal gears having different inside diameters on its inner peripheral surface; and
   a plurality of change gear units that are respectively arranged at locations of the housing in a direction along the input/output axis, at which the plurality of internal gears are formed, that are respectively in mesh with the plurality of internal gears, and that change the speed of rotation from the input shaft to the output shaft, wherein each of the change gear units includes
   a rotating member that is supported by the housing rotatably about the input/output axis, and that has one of a pin protruding in the direction along the input/output axis and an insertion hole in which the pin is inserted;
   an eccentric member that centers on an eccentric axis that is eccentric with respect to the input/output axis; and
   an annular oscillating member that is rotatably supported on an outer peripheral side of the eccentric member, that has an external gear which is formed on an outer peripheral surface and which is able to be in mesh with the internal gear and the other one of the pin and the insertion hole, and that oscillatingly rotates as the eccentric member rotates about the input/output axis, wherein
   the plurality of change gear units include one side change gear unit and the other side change gear unit that are next to each other,
   the eccentric member of the one side change gear unit is coupled to one of the input shaft and the output shaft,
   the rotating member of the one side change gear unit is coupled to the eccentric member of the other side change gear unit,
   the rotating member of the other side change gear unit is coupled to the other one of the input shaft and the output shaft, and
   the eccentric member of the other side change gear unit is integrally coupled to the rotating member of the one side change gear unit at a location eccentric in a radial direction of the rotating member of the one side change gear unit such that a radially outer peripheral surface of the rotating member of the one side change gear unit rotatably supports the eccentric member of the other side change gear unit.

2. The speed change gear according to claim 1, wherein at least one of the plurality of change gear units includes a rotating member that has the pin;
   a plurality of the eccentric members that are provided next to each other in the direction along the input/output axis; and
   a plurality of the oscillating members that have the insertion hole and that are respectively supported by the plurality of eccentric members.

3. The speed change gear according to claim 2, wherein the plurality of eccentric members of the at least one of the change gear units are coupled to one of the input shaft and the output shaft such that the oscillating members respectively supported by the plurality of eccentric members are arranged at equiangular positions in a circumferential direction of rotation about the input/output axis.

* * * * *